United States Patent
Ohmuro et al.

(10) Patent No.: US 7,027,116 B2
(45) Date of Patent: Apr. 11, 2006

(54) SUBSTRATE FOR LIQUID CRYSTAL DISPLAY AND LIQUID CRYSTAL DISPLAY HAVING THE SAME

(75) Inventors: Katsufumi Ohmuro, Kawasaki (JP); Norio Sugiura, Kawasaki (JP); Kunihiro Tashiro, Kawasaki (JP); Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/335,959

(22) Filed: Jan. 2, 2003

(65) Prior Publication Data

US 2003/0128317 A1    Jul. 10, 2003

(30) Foreign Application Priority Data

Jan. 4, 2002   (JP)   ............................. 2002-000186

(51) Int. Cl.
*G02F 1/1335* (2006.01)
(52) U.S. Cl. .................................................. 349/114
(58) Field of Classification Search ................ 349/113, 349/114
See application file for complete search history.

(56) References Cited

U.S. PATENT DOCUMENTS

| 5,598,285 | A | * | 1/1997 | Kondo et al. .................. 349/39 |
|---|---|---|---|---|
| 5,724,112 | A | * | 3/1998 | Yoshida et al. ............. 349/117 |
| 6,259,500 | B1 | * | 7/2001 | Kijima et al. ................ 349/113 |
| 6,281,952 | B1 | * | 8/2001 | Okamoto et al. ............. 349/12 |
| 6,292,240 | B1 | * | 9/2001 | Kamiya et al. ................ 349/84 |
| 6,753,938 | B1 | * | 3/2002 | Hanazawa et al. .......... 349/113 |
| 6,380,995 | B1 | * | 4/2002 | Kim ............................ 349/113 |
| 6,452,654 | B1 | * | 9/2002 | Kubo et al. .................. 349/114 |
| 6,476,889 | B1 | * | 11/2002 | Urabe et al. ................. 349/106 |
| 6,853,421 | B1 | * | 2/2003 | Ihida et al. .................. 349/114 |
| 6,583,840 | B1 | * | 6/2003 | Inoue et al. ................. 349/141 |
| 6,642,978 | B1 | * | 11/2003 | Kim ............................. 349/110 |
| 6,657,689 | B1 | * | 12/2003 | Baek ........................... 349/114 |
| 6,683,666 | B1 | * | 1/2004 | Jang et al. ................... 349/113 |
| 6,727,965 | B1 | * | 4/2004 | Kubota ........................ 349/113 |
| 6,798,480 | B1 | * | 9/2004 | Ono et al. .................... 349/115 |
| 6,819,379 | B1 | * | 11/2004 | Kubo et al. .................. 349/114 |
| 6,847,426 | B1 | * | 1/2005 | Fujimori et al. ............. 349/113 |
| 2001/0020991 | A1 | * | 9/2001 | Kubo et al. .................. 349/113 |
| 2003/0025859 | A1 | * | 2/2003 | Moon et al. ................. 349/113 |
| 2003/0067570 | A1 | * | 4/2003 | Okamoto et al. ........... 349/113 |

(Continued)

FOREIGN PATENT DOCUMENTS

JP          H05-232465        9/1993

(Continued)

*Primary Examiner*—Kenneth Parker
(74) *Attorney, Agent, or Firm*—Greer, Burns & Crain, Ltd.

(57) ABSTRACT

A substrate for a transflective liquid crystal display that is capable of display in both reflective and transmissive modes and a display having the same. One embodiment includes a substrate that sandwiches a liquid crystal in combination with an opposite substrate formed with a common electrode on the opposing surface, a plurality of bus lines on a top surface of the substrate that intersect each other with an insulation film interposed therebetween, and thin film transistors formed near the intersections of the plurality of bus lines. A plurality of pixel regions constituted of a plurality of reflective regions in which reflective electrodes for reflecting incident light from the side of the top surface of the substrate are formed in a matrix and transmissive regions which are provided around the reflective regions and which transmit incident light from the side of a bottom surface toward the top surface of the substrate.

20 Claims, 19 Drawing Sheets

U.S. PATENT DOCUMENTS

| | | | |
|---|---|---|---|
| 2003/0123001 A1* | 7/2003 | Ha et al. .................... | 349/113 |
| 2004/0196419 A1* | 10/2004 | Kanou et al. ............... | 349/113 |
| 2004/0207785 A1* | 10/2004 | Jang et al. .................. | 349/114 |
| 2004/0218120 A1* | 11/2004 | Ikeno et al. ................ | 349/113 |

FOREIGN PATENT DOCUMENTS

| | | |
|---|---|---|
| JP | H07-333598 | 12/1995 |
| JP | H08-338993 | 12/1996 |
| JP | H11-281972 | 10/1999 |
| JP | 2000-250056 | 9/2000 |

* cited by examiner (a)            (b)

(a)            (b)

(a)    (b)

(a)

(b)

US 7,027,116 B2

SUBSTRATE FOR LIQUID CRYSTAL DISPLAY AND LIQUID CRYSTAL DISPLAY HAVING THE SAME

BACKGROUND OF THE INVENTION

1. Field of the Invention

The present invention relates to a substrate for a transflective liquid crystal display that is used as a display of a portable electronic apparatus and that is capable of display in both of reflective and transmissive modes and to a liquid crystal display having the same.

2. Description of the Related Art

Liquid crystal displays are generally categorized into transmissive types in which a transparent electrode constituted of an ITO (indium tin oxide) is formed at each pixel and which have a backlight unit on a backside thereof and reflective types in which a reflective electrode made of aluminum (Al) is formed at each pixel. Among recent active matrix liquid crystal displays, reflective liquid crystal displays are drawing attention for their lighter weights, low profiles, and low power consumption. Single polarizer type reflective liquid crystal displays utilizing the TN (Twisted Nematic) mode as disclosed in Japanese Patent Laid-open No. 232465/1993 and Japanese Patent Laid-Open No. 338993/1996 have already been put in use. However, the visibility of a reflective liquid crystal display is greatly dependent on the brightness of the ambience, and a problem arises in that visibility is significantly reduced in a dark place where ambient brightness is relatively low.

A transmissive liquid crystal display exhibits a high contrast ratio and high visibility even in a dark place because it is illuminated from the backside thereof with a backlight unit. However, it has a problem in that visibility is significantly reduced in a place where ambient brightness is relatively high such as the outdoor in good weather (a bright place). Further, since a backlight unit is always used, another problem arises in that power consumption is great.

Liquid crystal displays that solve the above-described problems include front light type reflective liquid-crystal displays having a front light unit that provides illumination from the side of the display screen thereof. However, a front light type reflective liquid crystal display exhibits a contrast ratio lower than that of a transmissive liquid crystal display in a dark place because illumination light from the front light unit is reflected by not only the reflective electrodes but also the surface of the display screen. In a bright place, it presents darker display in a bright place compared to a normal reflective liquid crystal display because of light absorption at a light guide plate of the front light unit.

Another approach involves a transflective liquid crystal display in which transflective reflecting films are used as pixel electrodes as disclosed in Japanese Patent Laid-Open No. 333598/1995. In general, metal thin films such as aluminum having a thickness of about 30 nm are used as the transflective reflecting films. However, this results in a reduction in utilization of light because the metal thin films have a high absorption constant. Further, since it is difficult to form transflective reflecting films having a uniform thickness in the plane of a substrate, there will be variations of light transmittance and reflectance in the plane of the substrate.

A transflective liquid crystal display that solves the above-described problems was disclosed in Japanese Patent Laid-Open No. 281972/1999. FIG. 29 shows a configuration of a transflective liquid crystal display according to the related art. As shown in FIG. 29, a plurality of gate bus lines 104 extending in the vertical direction in the figure are formed in parallel with each other on a TFT substrate 102. A plurality of drain bus lines 106 extending in the horizontal direction in the figure are formed in parallel with each other such that they intersect with the gate bus lines 104 with an insulation film which is not shown interposed therebetween. TFTs 108 are formed in the vicinity of the positions where the bus lines 104 and 106 intersect with each other. Drain electrodes 140 of the TFTs 108 are electrically connected to the drain bus lines 106. Source electrodes 142 are electrically connected to reflective electrodes 110 made of aluminum through contact holes 144. The regions where the reflective electrodes 110 are formed serve as reflective regions of respective pixels. Openings are provided in the middle of the reflective electrodes 110 to form transparent electrodes 112 made of ITO. The regions where the transparent electrodes 112 are formed serve as transmissive regions of respective pixels.

FIG. 30 is a sectional view of the liquid crystal display taken along the line X—X in FIG. 29. As shown in FIG. 30, the liquid crystal display is constituted of the TFT substrate 102, an opposite substrate 114, and a liquid crystal layer 116 provided between the substrates 102 and 114. The TFT substrate 102 has a planarization film 120 in reflective regions on a glass substrate 118. A plurality of recesses and projections are formed on a surface of the planarization film 120. Reflective electrodes 110 are formed on the planarization film 120. On a surface of the reflective electrodes 110, there are formed recesses and projections which are associated with the recesses and projections formed on the surface of the planarization film 120 located under the same. The reflective electrodes 110 have improved light scattering characteristics thanks to the plurality of recesses and projections on the surface thereof, and they reflect and scatter external light incident thereupon in various directions.

Transparent electrodes 112 are formed in transmissive regions on the glass substrate 118. The transparent electrodes 112 transmit light emitted by a backlight unit (not shown) provided under the same in the figure. The transparent electrodes 112 are electrically connected to the reflective electrodes 110 through barrier metal layers 136 made of titanium (Ti) or molybdenum (Mo).

The counter substrate 114 has a common electrode 130 that extends throughout a top surface of the glass substrate 119. Polarizers 132 and 134 are applied to surfaces of the substrates 102 and 114 counter to surfaces thereof facing each other, respectively.

The liquid crystal display shown in FIGS. 29 and 30 achieves display in both of the reflective and transmissive modes by forming a reflective region and a transmissive region at each pixel.

In the above-described configuration, however, it is necessary to form both of the reflective electrodes 110 made of Al and the transparent electrodes 112 made of ITO. Further, since corrosion attributable to a battery effect occurs when Al and ITO are formed in contact with each other, the barrier metal layers 136 must be formed between the reflective electrodes 110 and the transparent electrodes 112. This has resulted in a problem in that the liquid crystal display involves complicated manufacturing steps and in that an increase in manufacturing cost occurs.

In the above-described configuration, a reflective region and a transmissive region are formed at each pixel. Therefore, the display exhibits reflection characteristics lower than those of a reflective liquid crystal display and transmission characteristics lower than those of a transmissive liquid crystal display. However, when the area of the reflective regions is increased to achieve improved reflection characteristics, the area of the transmissive regions further decreases to degrade the transmission characteristics further. Similarly, when the area of the transmissive regions is increased to achieve improved transmission characteristics, the area of the reflective regions decreases to degrade the reflection characteristics further. Thus, in a transflective liquid crystal display in the related art, reflection characteristics and transmission characteristics are in the relationship of tradeoff, and a problem has arisen in that it is difficult to improve both of the reflection characteristics and the transmission characteristics.

Further, while light incident upon the reflective regions pass through a color filter (CF) layer twice, the light passes through the CF layer only once in the transmissive regions. This results in a chromatic deviation between display in the reflective mode and display in the transmissive mode. While a chromatic deviation can be optically compensated to some degree, it can degrade display characteristics.

SUMMARY OF THE INVENTION

The invention provides a substrate for a liquid crystal display that provides high display characteristics at a low cost and a liquid crystal display having the same.

According to the invention, there is provided a substrate for a liquid crystal display, characterized in that it has a substrate that sandwiches a liquid crystal in combination with an opposite substrate provided opposite thereto, a plurality of bus lines formed on a top surface of the substrate such that they intersect with each other with an insulation film interposed therebetween, thin film transistors formed in the vicinity of positions where the plurality of bus lines intersect with each other, and a pixel region constituted of a plurality of reflective regions in which reflective electrodes for reflecting incident light from the side of the top surface of the substrate are formed in the form of a matrix and transmissive regions which are provided around the plurality of reflective regions and which transmit incident light from the side of a bottom surface of the substrate toward the top surface of the substrate.

DESCRIPTION OF THE PREFERRED EMBODIMENTS

First Mode for Carrying Out the Invention

Figure 1:
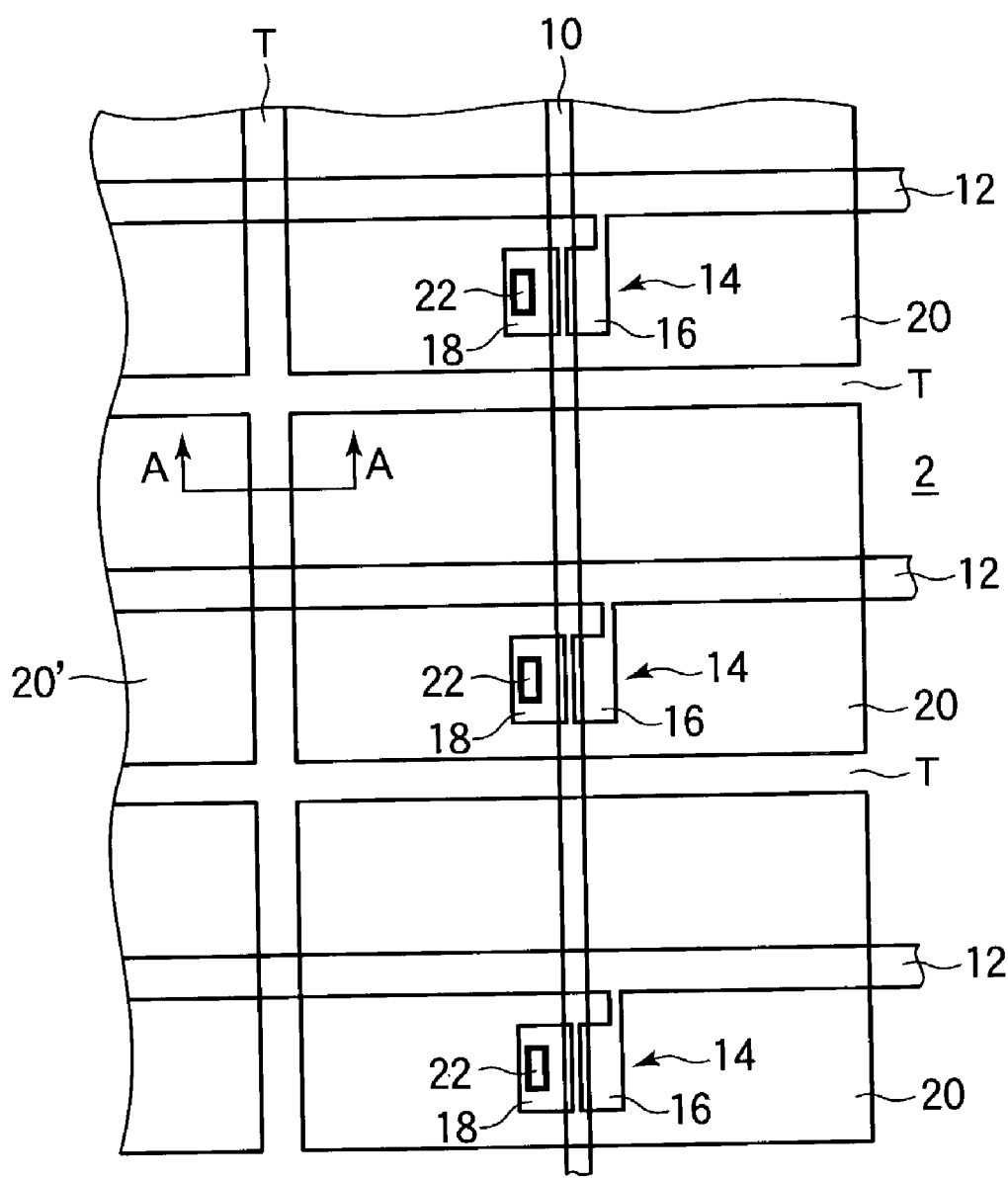
FIG. 1 is a diagram showing a liquid crystal display according to a first basic configuration in a first mode for carrying out the invention.

A description will now be made with reference to FIGS. 1 to 26 on a substrate for a liquid crystal display and a liquid crystal display having the same in a first mode for carrying out the invention. First, a description will be made with reference to FIGS. 1 and 2 on a first basic configuration according to the invention that is a prerequisite of the present embodiment. FIG. 1 shows a liquid crystal display having the first basic configuration. As shown in FIG. 1, a plurality of gate bus lines 10 (FIG. 1 shows only one of them) extending in the vertical direction in the figure are formed in parallel with each other on a TFT substrate (base substrate) 2. A plurality of drain bus lines 12 extending in the horizontal direction in the figure are formed in parallel with each other such that they intersect with the gate bus lines 10 with an insulation film that is not shown interposed therebetween. TFTs 14 are formed in the vicinity of the intersections between the bus lines 10 and 12. Drain electrodes 16 of the TFTs 14 are extracted from the drain bus lines 12 and are formed such that their ends are located on edges of active semiconductor layers formed of amorphous silicon (a-Si) on the gate bus lines 10 and channel protection films formed on the same on one side thereof (the layers and films are both omitted in the figure).

Source electrodes 18 of the TFTs 14 are formed such that they are located on other edges of the active semiconductor layers and channel protection films on another other side thereof. In such a configuration, the gate bus lines 10 located directly under the channel protection films serve as gate electrodes of the TFTs 14. Reflective electrodes 20 are formed above the intersections between the bus lines 10 and 12 and the TFTs 14. The source electrodes 18 of the TFTs 14 are electrically connected to the reflective electrodes 20 through contact holes 22.

Figure 2:
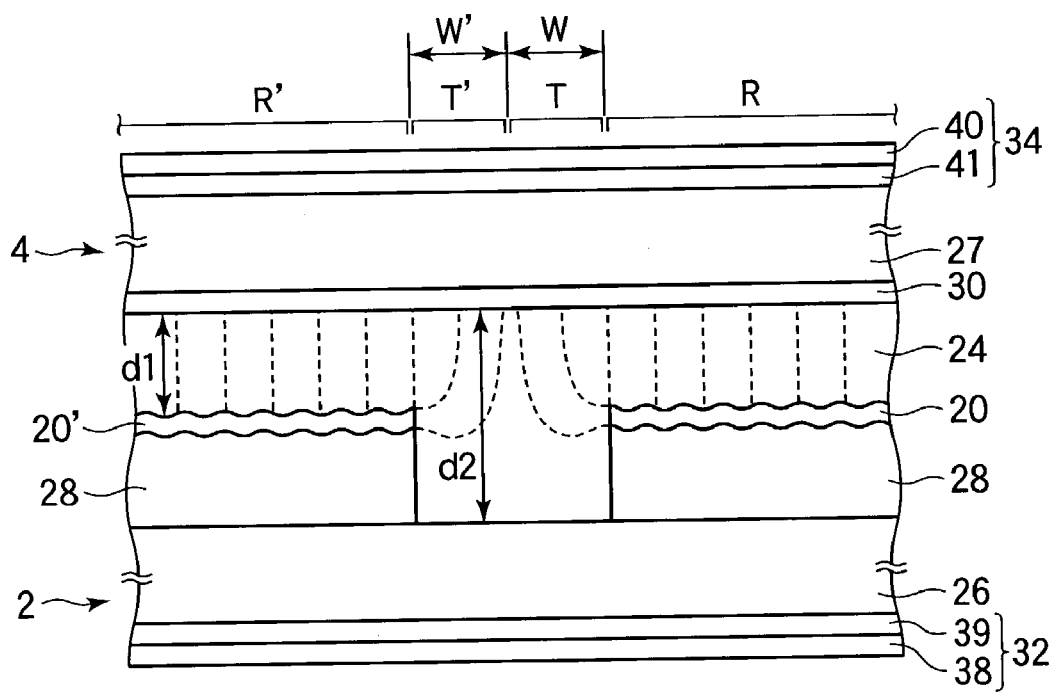
FIG. 2 is a diagram showing the liquid crystal display according to the first basic configuration in the first mode for carrying out the invention.

FIG. 2 shows a section of the liquid crystal display taken along the line A—A in FIG. 1. The liquid crystal display has a TFT substrate 2, a counter substrate 4, and a liquid crystal layer 24 located between the substrates 2 and 4. The TFT substrate 2 and the counter substrate 4 are provided opposite to each other with a cell gap d1 interposed therebetween. For example, the TFT substrate 2 has a planarization film 28 having a thickness substantially equal to the cell gap d1 on a glass substrate 26. A plurality of recesses and projections are formed on a surface of the planarization film 28. Reflective electrodes 20 and 20' made of Al are formed at each pixel on the planarization film 28. On a surface of the reflective electrodes 20 and 20', there are formed recesses and projections which are associated with the recesses and projections formed on the surface of the planarization film 28 located under the same. The reflective electrodes 20 and 20' have improved light scattering characteristics thanks to the plurality of recesses and projections formed on the surface of the same, and external light incident upon the reflective electrodes 20 and 20' is scattered and reflected in various directions. The reflective electrodes 20 and 20' are provided at an interval w+w'.

The opposite electrode 4 has a common electrode 30 constituted of an ITO that covers a surface of a glass substrate 27 entirely. Predetermined polarizers 32 and 34 are applied to surfaces of the substrates 2 and 4 opposite to surfaces thereof facing each other, respectively. A backlight unit (not shown) is provided under the TFT substrate 2 in the figure.

Figure 30:
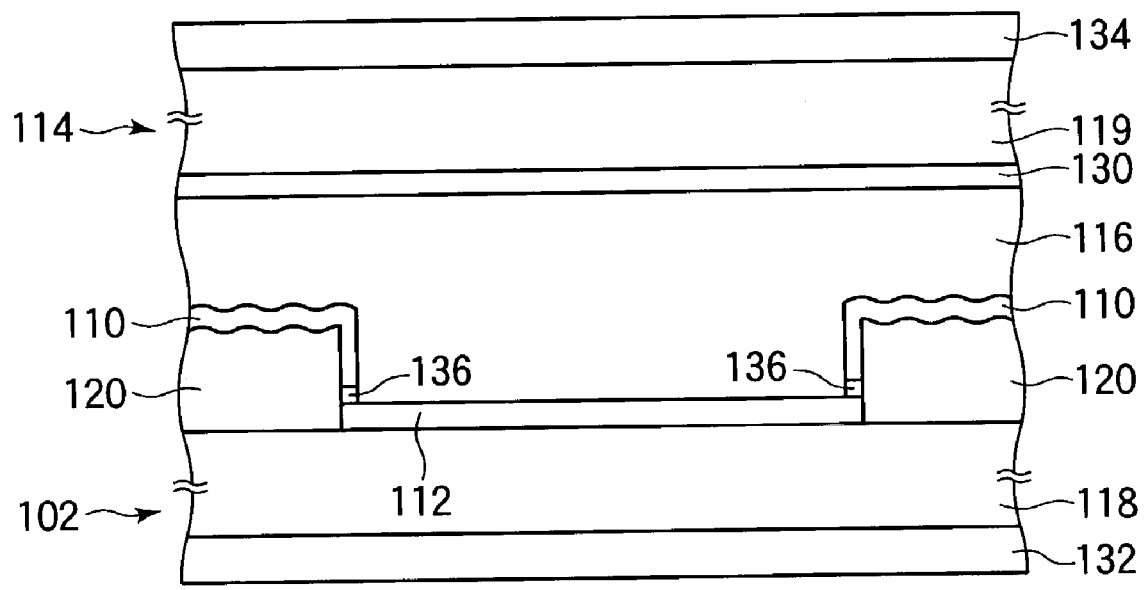
FIG. 30 is a sectional view showing the configuration of the transflective liquid crystal display according to the related art.

The regions where the reflective electrodes 20 are formed constitute reflective regions R that reflect external light incident thereupon. Similarly, the regions where the reflective electrodes 20' are formed constitute reflective regions R'. Regions where the reflective electrodes 20 and 20' are not formed constitute transmissive regions T and T' that transmit light emitted by the backlight unit. The transparent electrodes Tare located within ranges where they are at a distance w ($\equiv$d1) or closer to edges of the reflective electrodes 20, and the transparent electrodes T' are located within ranges where they are at a distance w' ($\equiv$d1) or closer to edges of the reflective electrodes 20'. That is, a reflective region R constitutes one pixel in combination with a transmissive region T provided in the neighborhood of the same. A reflective region R' constitutes one pixel in combination with a transmissive region T' provided in the neighborhood of the same. No transparent electrode 112 as shown in FIG. 30 is formed in the transmissive regions T and T'.

FIG. 2 shows a state of a reflective electrode 20 in which a predetermined grayscale voltage is applied thereto. The broken lines in the figure indicate an electric field between the reflective electrode 20 and the common electrode 30. In the transmissive region T, an oblique field is generated between the common electrode 30 and an edge of the reflective electrode 20 at an angle to a direction perpendicular to the substrate surface. Liquid crystal molecules in the transmissive region T are driven by the oblique field substantially similarly to liquid crystal molecules in the reflective region R. In the transmissive region T' an oblique field is generated between the common electrode 30 and an edge of the reflective electrode 20'. Liquid crystal molecules in the transmissive region T' are driven by the oblique field substantially similarly to liquid crystal molecules in the reflective region R'.

The planarization film 28 is removed in the transmissive regions T and T'. A cell gap d2 between the transmissive regions T and T' is substantially twice the cell gap d1 between the reflective regions R and R', because the thickness of the planarization film 28 is substantially similar to the cell gap d1. Therefore, retardation ($\Delta$n·d) that occurs in the liquid crystal layer 24 when liquid crystal molecules are aligned in parallel with the substrate surface is $\lambda$/4 in the reflective regions R and R', and it is doubled or $\lambda$/2 in the transmissive regions T and T'.

In the first basic configuration of the invention, the reflective electrodes 20 are provided at the intersections between the bus lines 10 and 12 and on the TFTs 14 to reduce the area of the bus lines 10 and 12 exposed in the transmissive regions T and T' significantly, which increases the area of the transmissive regions T and T' without decreasing the area of the reflective regions R and R'. That is, in the first basic configuration, bus line wiring regions that have not been used as reflective regions nor as transmissive regions in a transflective liquid crystal display in the related art are used as the transmissive regions T and T'. Therefore, transmission characteristics can be improved without degrading reflection characteristics to improve utilization of light. Further, no transparent electrode 112 is formed in the transmissive regions T and T' in the first basic configuration. Therefore, steps for forming transparent electrodes 112 and forming barrier metal layers 136 can be omitted to reduce the manufacturing cost.

Figure 3:
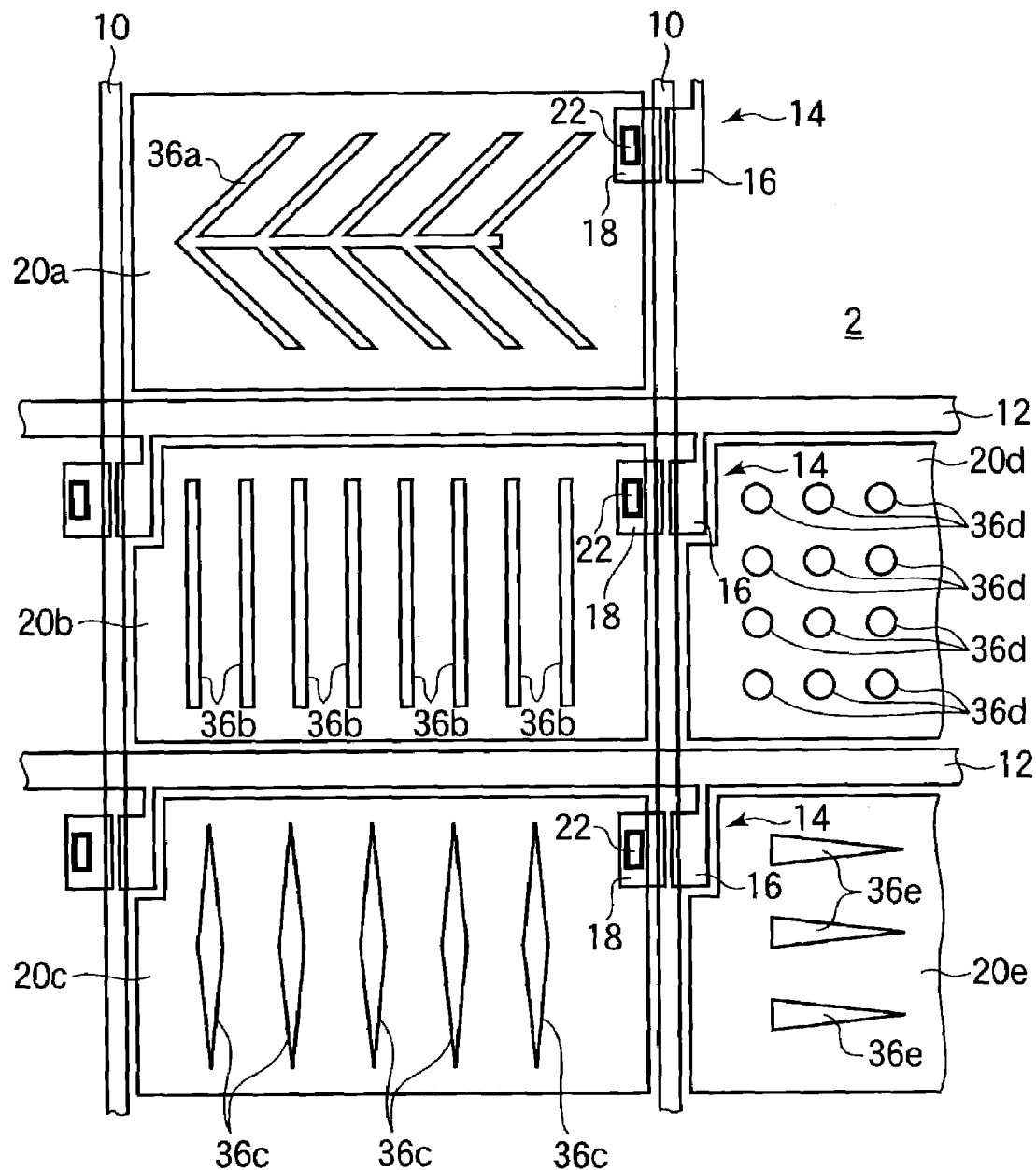
FIG. 3 is a diagram showing a liquid crystal display according to a second basic configuration in the first mode for carrying out the invention.

A second basic configuration of the invention will now be described with reference to FIG. 3. FIG. 3 shows a liquid crystal display having the second basic configuration. Components having functions and effects like those in the liquid crystal display having the first basic configuration shown in FIG. 1 are indicated by like reference numerals and will not be described. As shown in FIG. 3, reflective electrodes 20*a* to 20*e* constituting reflective regions R are formed in regions defined by gate bus lines 10 and drain bus lines 12. The reflective electrodes 20*a* to 20*e* have openings 36*a* to 36*e* that are formed in various configurations such as slits and circular and polygonal holes.

For example, the reflective electrode 20*a* is formed with an opening 36*a* which is constituted of one slit extending in parallel with longer sides of the reflective electrode 20*a* and a plurality of slits extending at an angle to the longer sides of the reflective electrodes 20*a*. The reflective electrode 20*b* is formed with a plurality of straight openings 36*b* extending in parallel with shorter sides of the reflective electrode 20*b*. The reflective electrode 20*c* is formed with a plurality of elongate rhombic openings 36*c* extending in parallel with shorter sides of the reflective electrode 20*c*. The reflective electrode 20*d* is formed with a plurality of circular openings 36*d*. The reflective electrode 20*e* is formed with a plurality of wedge-shaped openings 36*e* extending in parallel with longer sides of the reflective electrode 20*e*.

The regions where the openings 36*a* to 36*e* are formed serve as transmissive regions T. No transparent electrode 112 as shown in FIG. 30 is formed at the openings 36*a* to 36*e*. Liquid crystal molecules in the transmissive regions T are driven by an oblique field between edges of the reflective electrodes 20*a* to 20*e* and a common electrode 30 (not shown in FIG. 3) substantially similarly to liquid crystal molecules in reflective regions R.

The openings 36*a* to 36*e* in each pixel may have the same configuration. The openings 36*a* to 36*e* may have a configuration to regulate alignment of liquid crystal molecules. As a result, in a VA (Vertical Aligned) mode liquid crystal display in which liquid crystal molecules are aligned substantially perpendicularly to the substrate surface, separate alignments can be achieved without a process of rubbing the alignment film. The present basic configuration may be used in a liquid crystal display in the TN mode utilizing a horizontal alignment film or the HAN (Hybrid Aligned Nematic) mode utilizing a horizontal alignment film in one direction and a vertical alignment film in another, although a rubbing process is required.

In the second basic configuration of the invention, since no transparent electrode 112 is formed in the transmissive regions T, steps for forming transparent electrodes 112 and barrier metal layers 136 can be omitted to reduce the manufacturing cost just as in the first basic configuration.

Figure 4:
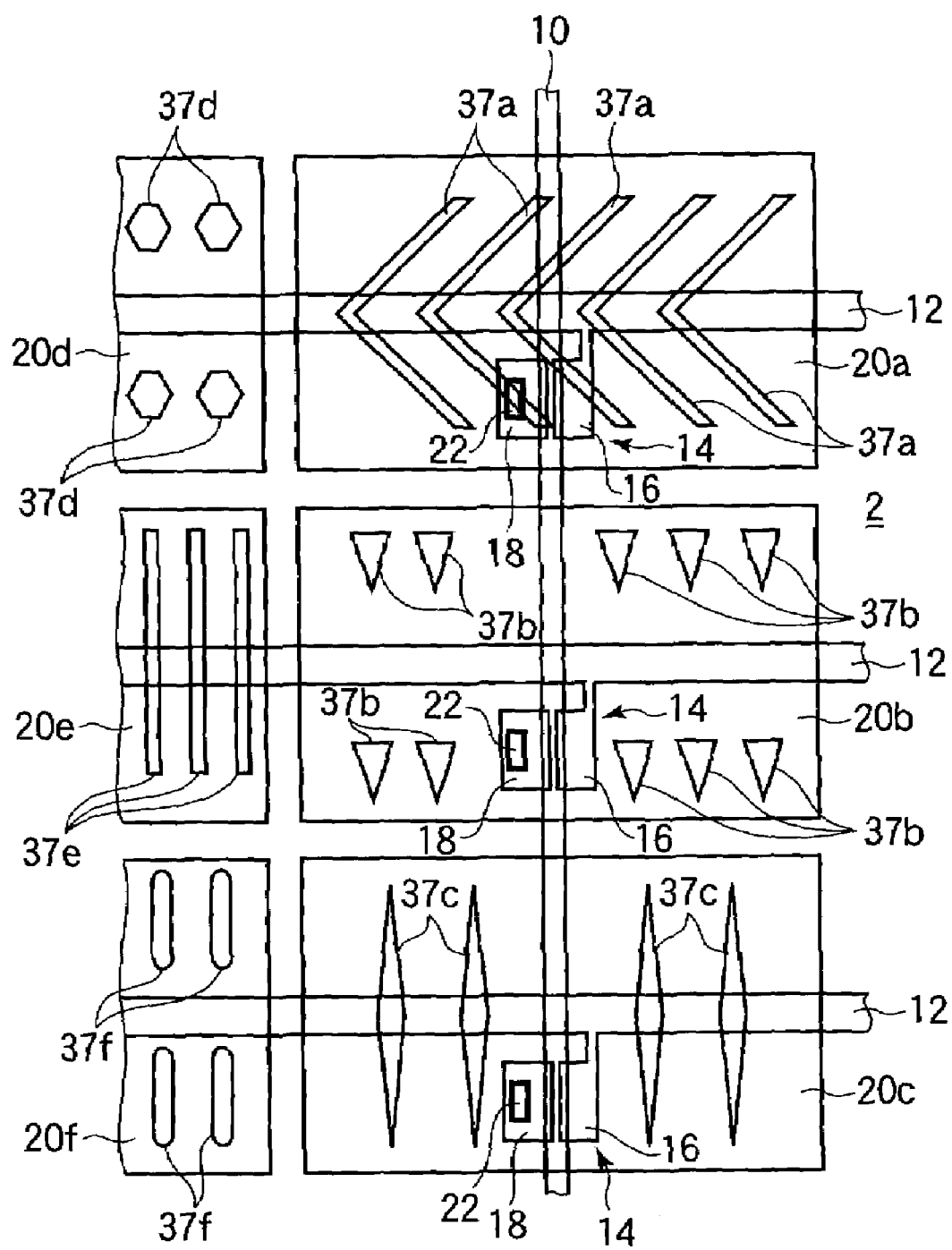
FIG. 4 is a diagram showing a liquid crystal display having a combination of the first and second basic configurations in the first mode for carrying out the invention.

FIG. 4 shows a liquid crystal display according to a combination of the first and second basic configurations. As shown in FIG. 4, reflective electrodes 20*a* to 20*f* are formed at intersections between bus lines 10 and 12 and above TFTs 14. The reflective electrodes 20*a* to 20*f* have openings 37*a* to 37*f* that are formed in various configurations.

For example, the reflective electrode 20*a* is formed with a plurality of openings 37*a* constituted of V-shaped slits extending at an angle to longer sides of the reflective electrodes 20*a*. The reflective electrode 20*b* is formed with a plurality of triangular openings 37*b*. The reflective electrode 20*c* is formed with a plurality of elongate rhombic openings 37*c* extending in parallel with shorter sides of the reflective electrode 20*c*. The reflective electrode 20*d* is formed with a plurality of hexagonal openings 37*d*. The reflective electrode 20*e* is formed with a plurality of straight openings 37*e* extending in parallel with shorter sides of the reflective electrode 20*e*. The reflective electrode 20*f* is formed with a plurality of straight openings 37*f* extending in parallel with shorter sides of the reflective electrode 20*f*.

Like the first and second basic configurations, such a configuration also makes it possible to omit the steps for forming transparent electrodes 112 and barrier metal layers 136 for a reduced manufacturing cost.

Substrates for a liquid crystal display having the first and second basic configurations and liquid crystal displays having the same will now be described with reference to first through seventh embodiments of the invention.

Figure 5:
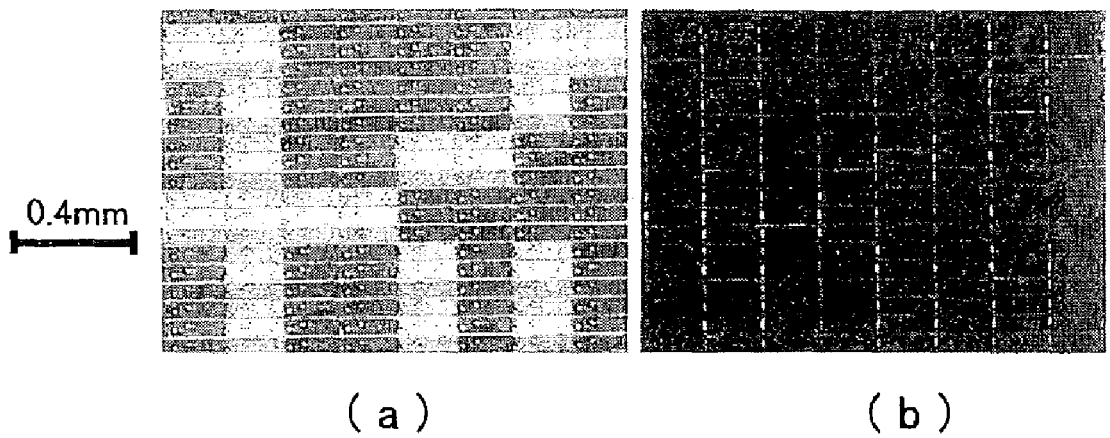
FIGS. 5A and 5B show microphotographs of states of display of predetermined images on the liquid crystal display according to a first embodiment in the first mode for carrying out the invention.
Figure 6:
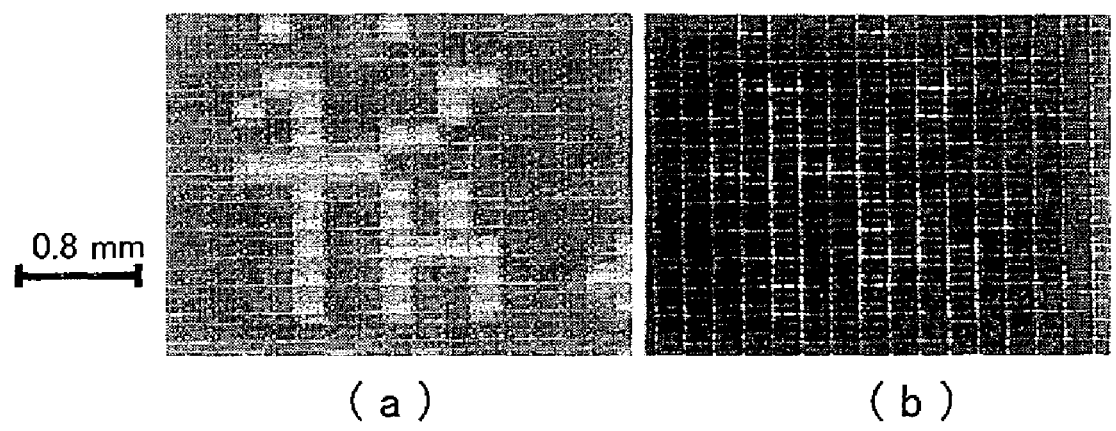
FIGS. 6A and 6B show states of display of predetermined images on the liquid crystal display according to the first embodiment in the first mode for carrying out the invention.

First, a liquid crystal display according to the first embodiment of the invention will now be described with reference to FIGS. 5 and 6. Since the liquid crystal display of the present embodiment has a configuration substantially similar to the first basic configuration shown in FIGS. 1 and 2, the description will be made with reference to FIGS. 1 and 2. As shown in FIGS. 1 and 2, in the liquid crystal display of the present embodiment, horizontal alignment films made of, for example, polyimide resin are formed on opposite surfaces of a TFT substrate 2 and an opposite substrate 4, and a predetermined rubbing process is performed on the same. The substrates 2 and 4 are combined with a cell gap d1 (of 3 μm, for example) left therebetween, and a nematic liquid crystal having positive dielectric anisotropy ($\Delta n=0.67$) is sealed between the substrates 2 and 4. The alignment of the liquid crystal molecules is a homogeneous alignment in which the major axes of the liquid crystal molecules are in parallel with each other and also in parallel with the substrate surfaces.

A polarizer 32 is a circular polarization plate that is constituted of a $\lambda/4$ phase difference plate 39 provided on a glass substrate 26 and a linear polarization plate 38 provided outside the same. The polarization axis (light transmission axis) of the linear polarization plate 38 and the optic axis (delay axis) of the $\lambda/4$ phase difference plate 39 are provided at an angle of 45 degrees. The delay axis denotes the bigger one of the refractive index nx, ny toward inner surfaces of the optical films. Similarly the polarization plate 34 is a circular polarization plate that is constituted of a $\lambda/4$ phase difference plate 41 provided on side of the glass substrate 27 and a linear polarization plate 40 outside it. Polarization axis of the linear polarization plate 40 and the delay axis of $\lambda/4$ phase difference plate 41 are rotated and fixed at an angle of 45 degrees.

In the present embodiment, reflective electrodes 20 are provided at intersections between the bus lines 10 and 12 and on the TFTs 14 just as in the first basic configuration, which reduces the area of the bus lines 10 and 12 exposed in the transmissive regions T and T' to increase the area of the transmissive regions T and T' without reducing the area of the reflective regions-R and R'. That is, in the present embodiment, regions which have not been used as reflective regions nor transmissive regions in a transflective liquid crystal display according to the related art are used as the transmissive regions T and T'. This makes it possible to improve transmission characteristics without degrading reflection characteristics.

A display operation of the liquid crystal display of the present embodiment will now be described with reference to FIGS. 5A, 5B, 6A, and 6B. FIGS. 5A, 5B, 6A, and 6B show states of display of predetermined images on the liquid crystal display of the present embodiment. FIGS. 5A and 5B are microphotographs showing states of display of predetermined images on the liquid crystal display of the present embodiment that are enlarged with a relatively high magnification (about 30×). FIGS. 6A and 6B are microphotographs of states of display of predetermined images on the liquid crystal display of the present embodiment that are enlarged with a relatively low magnification (about 15×). FIGS. 5A and 6A show states of display in the reflective mode, and FIGS. 5B and 6B show states of display in the transmissive mode. As shown in FIGS. 5A, 5B, 6A, and 6B, the present embodiment allows display in the transmissive mode without sacrificing high display characteristics in the reflective mode.

The polarizer 32 used in the present embodiment is a circular polarizer that is a combination of a linear polarizing plate 38 and a λ/4 phase difference plate 39. Display characteristics of a transmissive display depend on the film used as the λ/4 phase difference plate 39. Table 1 shows differences in transmission characteristic depending on the λ/4 phase difference plate 39 that forms a part of the polarizer 32 on the backlight side.

TABLE 1

| λ/4 phase difference | White display (cd/m$^2$) | Black display (cd/m$^2$) | CR |
| --- | --- | --- | --- |
| plate 39 of polarizer 32 one ARTON film | 5.1 | 1.9 | 2.7 |
| Phase difference film with reciprocal wavelength dispersal | 5.3 | 1.7 | 3.0 |
| No film (linear polarizer 38 only) | 6.1 | 1.2 | 5.0 |

As shown in Table 1, when a sheet of ARTON film is used as the λ/4 phase difference plate 39 of the polarizer 32, it provides luminance of 5.1 cd/m$^2$ for a white display and luminance of 1.9 cd/m$^2$ for a black display. It provides a contrast ratio (CR) of 2.7.

When a phase difference film with reciprocal wavelength dispersion is used as the λ/4 phase difference plate 39 of the polarizer 32, it provides luminance of 5.3 cd/m$^2$ for a white display and luminance of 1.7 cd/m$^2$ for a black display. It provides a contrast ratio of 3.0.

When only the linear polarizer 38 is used without the λ/4 phase difference plate 39, it provides luminance of 6.1 cd/m$^2$ for a white display and luminance of 1.2 cd/m$^2$ for a black display. It provides a contrast ratio 5.0. In this case, however, since brightness and darkness in a display are inverted between the transmissive mode and the reflective mode, grayscale signals must be converted in synchronism with the turning on of the backlight to achieve a desired display.

It is apparent from the above that the liquid crystal display of the present embodiment can achieve transmission characteristics sufficient for use in a dark place, although it has a contrast ratio lower than that of a transmissive liquid crystal display.

A description will now be made with reference to FIGS. 7A to 11 on a substrate for a liquid crystal display and a liquid crystal display having the same according to a second embodiment of the invention. Since the liquid crystal display of the present embodiment has a configuration substantially similar to the second basic configuration shown in FIG. 3, the description will be made with reference to FIG. 3. As shown in FIG. 3, in the present embodiment, reflective electrodes 20a to 20e that constitute reflective regions R are formed in regions defined by gate bus lines 10 and drain bus lines 12. The reflective electrodes 20a to 20e have openings 36a to 36e formed in various configurations. The regions where the openings 36a to 36e are formed constitute transmissive regions T.

For example, horizontal alignment films made of polyimide resin are formed on surfaces of a TFT substrate 2 and an opposite substrate 4 (not shown in FIG. 3), and a predetermined rubbing process is performed on the same. The substrates 2 and 4 are combined with a cell gap of 2 μm therebetween for example, and a nematic liquid crystal having positive dielectric anisotropy is sealed between the substrates 2 and 4. The alignment of the liquid crystal molecules is a homogeneous alignment in which the major axes of the liquid crystal molecules are in parallel with each other and also in parallel with the substrate surfaces.

Figure 7:
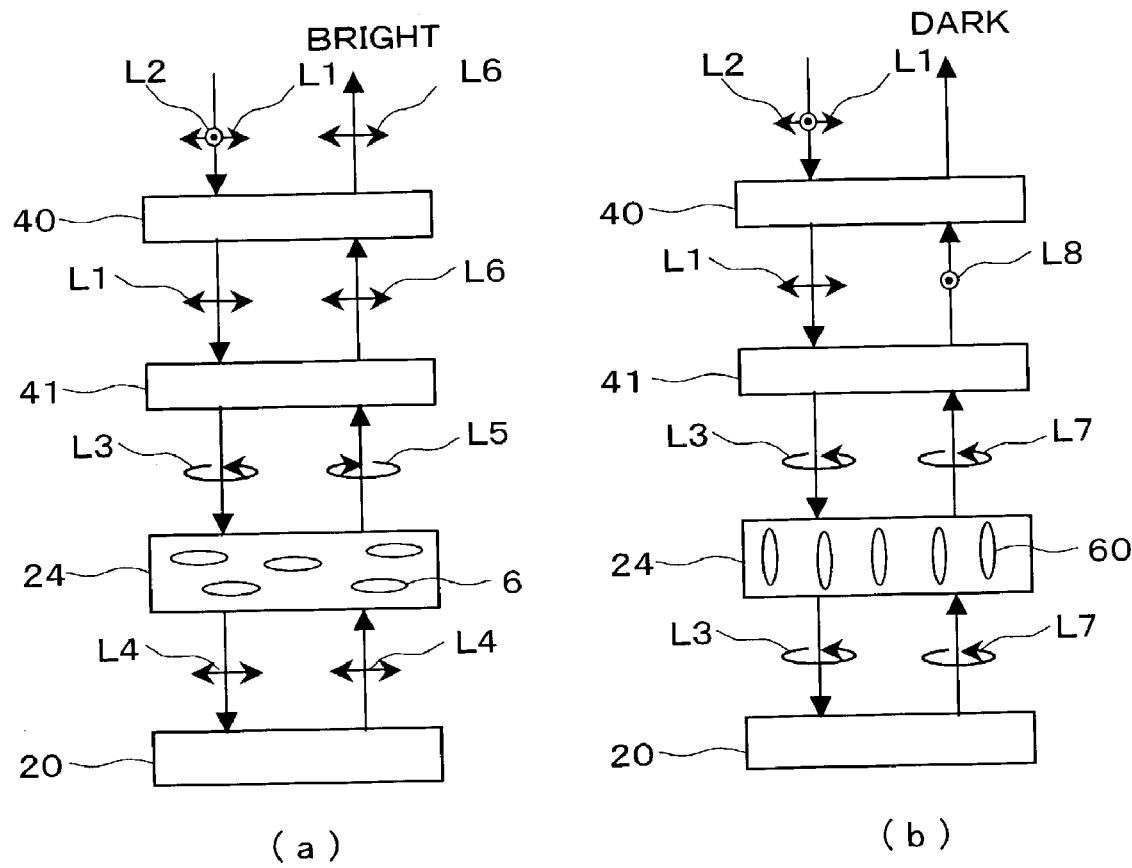
FIGS. 7A and 7B schematically show a sectional configuration of a liquid crystal display according to a second embodiment in the first mode for carrying out the invention.

A description will now be made with reference to FIGS. 7A to 11D on principles behind operations of the liquid crystal display of the present embodiment that is in the normally white mode. First, a principle behind operations in the reflective mode will be described. FIGS. 7A and 7B schematically show a sectional configuration of the liquid crystal display of the present embodiment taken in a reflective region R. FIG. 7A shows a white display (a bright state), and FIG. 7B shows a black display (a dark state). A λ/4 phase difference plate 41 is provided on a side of a liquid crystal layer 24 in the reflective region R, the side facing toward a viewer (upward in the figure). A linear polarizer 40 is provided closer to a viewer than is the λ/4 phase difference plate 41. The linear polarizer 40 has a polarization axis in a direction in parallel with the plane of the drawing. A reflective electrode 20 is provided on the side of the liquid crystal layer 24 opposite to the viewer's side (facing downward in the figure).

Figure 8:
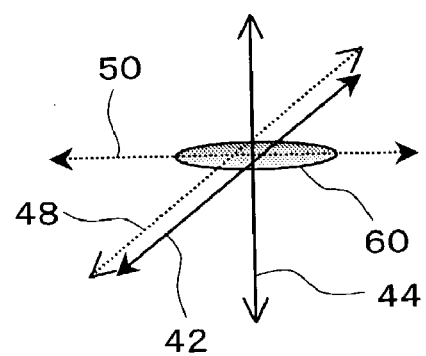
FIG. 8 shows an arrangement of optical axes of the liquid crystal display according to the second embodiment in the first mode for carrying out the invention.
Figure 9:
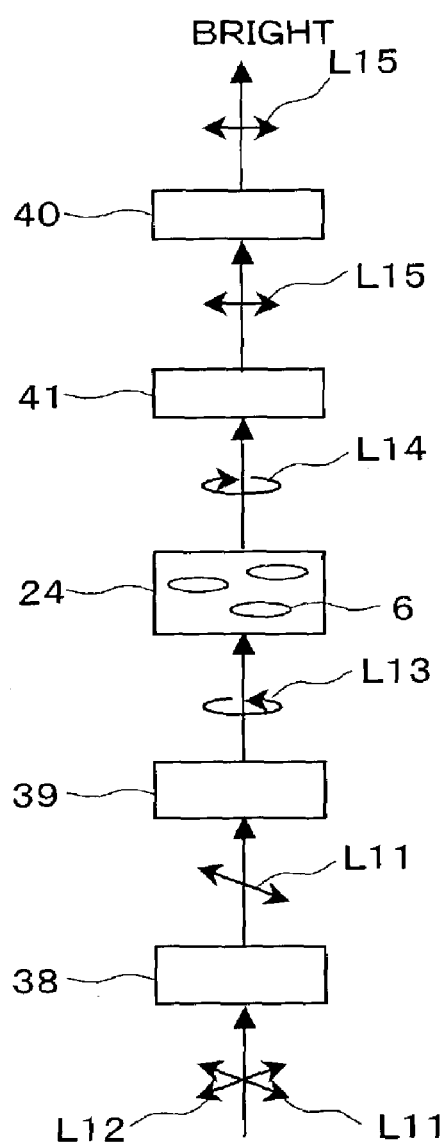
FIGS. 9A and 9B schematically show a sectional configuration of the liquid crystal display according to the second embodiment in the first mode for carrying out the invention.
Figure 9:
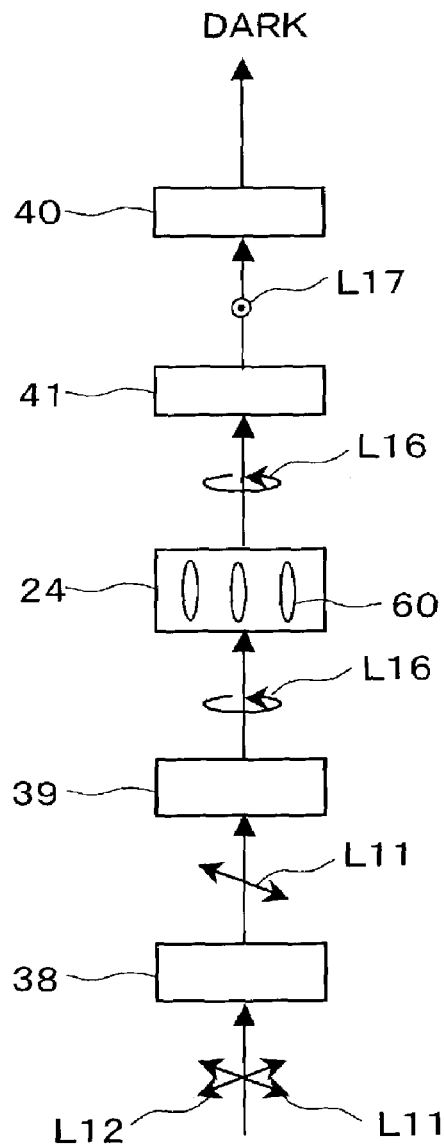
Figure 10:
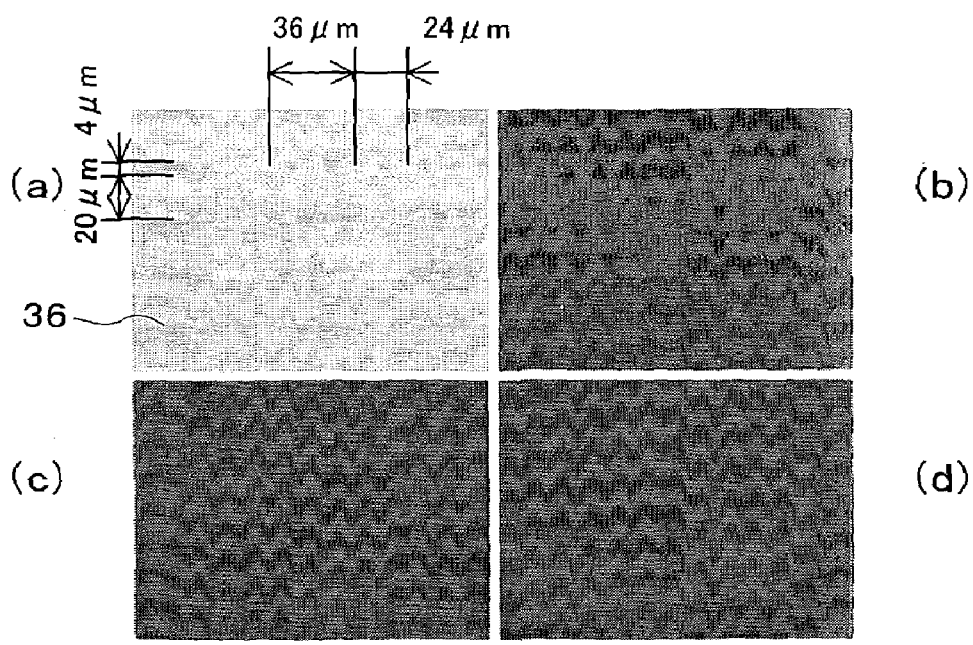
FIGS. 10A to 10D show states of display of the liquid crystal display in a reflective mode according to the second embodiment in the first mode for carrying out the invention.
Figure 11:
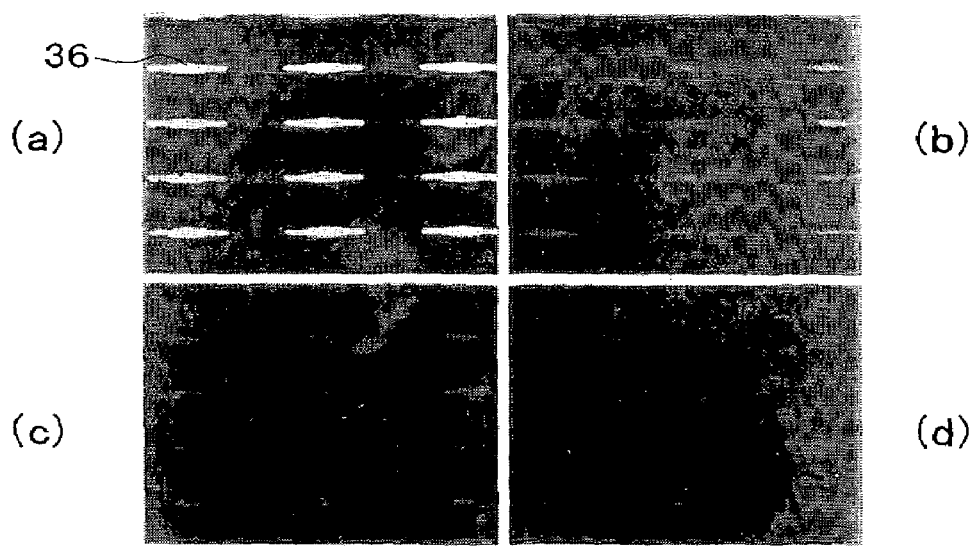
FIGS. 11A to 11D show states of display of the liquid crystal display in a transmissive mode according to the second embodiment in the first mode for carrying out the invention.

FIG. 8 shows an arrangement of optical axes of optical films of the liquid crystal display of the present embodiment as viewed from the viewer's side. As shown in FIG. 8, an optical axis 44 of the λ/4 phase difference plate 41 on the viewer's side is rotated counterclockwise at 45 degrees relative to a polarization axis 42 of the linear polarizer 40 on the viewer's side. A polarization axis 50 of the polarizer 38 on the backlight unit side is rotated clockwise at 45 degrees relative to an optical axis 48 of the λ/4 phase difference plate 39. Liquid crystal molecules 60 are aligned in parallel with the substrate surfaces.

In FIGS. 7A and 7B, external light is represented by a linearly polarized light beam Li having a polarization direction in parallel with the polarization axis 42 of the linear polarizer 40 and a linearly polarized light beam L2 having a polarization direction which is orthogonal to the light beam Li and which is perpendicular to the plane of the drawing. Retardation (Δn·d1) that occurs in the liquid crystal layer 24 in the reflective region R becomes λ/4 when the liquid crystal molecules 60 are aligned in parallel with the substrate surfaces and becomes zero when the liquid crystal molecules 60 are aligned perpendicularly to the substrate surfaces.

As shown in FIG. 7A, when external light enters the linear polarizer 40 from the viewer's side, the light beam L2 is absorbed by the linear polarizer 40, and only the light beam LI is transmitted by the linear polarizer 40. When the light beam Li thereafter enters the λ/4 phase difference plate 41 having the optical axis 44 that is rotated counterclockwise at 45 degrees to the polarization direction of the same as viewed from the viewer's side, it becomes a light beam L3 that is circularly polarized counterclockwise as viewed from the viewer's side. Next, the light beam L3 enters the liquid crystal layer 24. No voltage is applied to the liquid crystal molecules 60 in the liquid crystal layer 24, in which state they are aligned substantially in parallel with the substrate surfaces. In this state, the liquid crystal molecules 60 have refractive index anisotropy, which results in retardation of $\lambda/4$ in the liquid crystal layer 24. As a result, the light beam L3 becomes a linearly polarized light beam L4 having a polarization direction in parallel with the plane of the drawing, is reflected by reflective electrode 20 and enters the liquid crystal layer 24. Because of retardation in the liquid crystal layer 24, the light beam L4 becomes a light beam L5 that is circularly polarized clockwise as viewed from the viewer's side. Then, the light beam L5 enters the $\lambda/4$ phase difference plate 41 and becomes a linearly polarized light beam L6 which is in parallel with the plane of the drawing and which exits the $\lambda/4$ phase difference plate 41. Since the light beam L6 has a polarization axis in parallel with the polarization axis 42 of the linear polarizer 40, it passes through the linear polarizer 40 to exit the same toward the viewer, which results in a white display.

As shown in FIG. 7B, when external light enters the linear polarizer 40 from the viewer's side, the light beam L2 is absorbed by the linear polarizer 40, and only the light beam L1 is transmitted by the linear polarizer 40. Then, the light beam L1 enters the $\lambda/4$ phase difference plate 41 and becomes a light beam L3 that is circularly polarized counterclockwise as viewed from the viewer's side. Next, the light beam L3 enters the liquid crystal layer 24. A predetermined voltage is applied to the liquid crystal molecules 60 in the liquid crystal layer 24, in which state they are aligned substantially perpendicularly to the substrate surfaces. In this state, since the liquid crystal molecules 60 have no refractive index anisotropy, there is substantially zero retardation in the liquid crystal layer 24. Thus, the light beam L3 enters the reflective electrode 20 while remaining in the counterclockwise circularly polarized state as viewed from the viewer's side. The light beam L3 remains in the counterclockwise circularly polarized state as viewed from the viewer's side though it is reflected by the reflective electrode 20 and becomes a light beam L7 to enter the liquid crystal layer 24 again. Since there is substantially zero retardation in the liquid crystal layer 24, the light beam L7 enters the $\lambda/4$ phase difference plate 40 while remaining in the counterclockwise circularly polarized state as viewed from the viewer's side. It then becomes a linearly polarized light beam L8 which is perpendicular to the plane of the drawing and which exits the $\lambda/4$ phase difference plate 40. The light beam L8 is absorbed by the linear polarizer 40 because it has a polarization direction orthogonal to the polarization axis 42 of the linear polarizer 40, and the light does not exit toward the viewer, which results in a black display.

A principle of operations in the transmissive mode will be described. FIGS. 9A and 9B schematically show a sectional configuration of the liquid crystal display of the present embodiment taken in a transmissive region T. FIG. 9A shows a white display, and FIG. 9B shows a black display. A $\lambda/4$ phase difference plate 39 is provided on a side of liquid crystal layer 24 in the transmissive region T, the side facing toward a backlight unit (downward in the figure). A linear polarizer 38 is provided closer to the backlight unit than is the $\lambda/4$ phase difference plate 39.

Referring to FIG. 8 again, the optical axis 44 of the $\lambda/4$ phase difference plate 41 on the viewer's side is rotated counterclockwise at 45 degrees relative to the polarization axis 42 of the linear polarizer 40 on the viewer's side. The polarization axis 50 of the polarizer 38 on the backlight unit side is rotated clockwise at 45 degrees relative to the optical axis 48 of the $\lambda/4$ phase difference plate 39.

In FIGS. 9A and 9B, illumination light from the backlight unit is represented by a linearly polarized light beam L11 having a polarization direction in parallel with the polarization axis 50 of the linear polarizer 38 and a linearly polarized light beam L12 having a polarization direction which is orthogonal to the light beam L11. Retardation ($\Delta n \cdot d2$) that occurs in the liquid crystal layer 24 in the transmissive region T becomes $\lambda/2$ when the liquid crystal molecules 60 are aligned in parallel with the substrate surfaces and becomes substantially zero when the liquid crystal molecules 60 are aligned perpendicularly to the substrate surfaces.

As shown in FIG. 9A, when the illumination light from the backlight unit enters the linear polarizer 38, the light beam L12 is absorbed by the linear polarizer 38, and only the light beam L11 is transmitted by the linear polarizer 38. When the light beam L11 thereafter enters the $\lambda/4$ phase difference plate 39 having the optical axis 48 that is rotated counterclockwise at 45 degrees to the polarization direction of the same as viewed from the viewer's side, it becomes a light beam L13 that is circularly polarized counterclockwise as viewed from the viewer's side. Next, the light beam L13 enters the liquid crystal layer 24. No voltage is applied to the liquid crystal molecules 60 in the liquid crystal layer 24, in which state they are aligned substantially in parallel with the substrate surfaces. In this state, the liquid crystal molecules 60 have refractive index anisotropy, which results in retardation of $\lambda/2$ in the liquid crystal layer 24. As a result, the light beam L13 becomes a clockwise circularly polarized light beam L14 as viewed from the viewer's side. Then, the light beam L14 enters the $\lambda/4$ phase difference plate 41 and becomes a linearly polarized light beam L15 in parallel with the plane of the drawing to exit the $\lambda/4$ phase difference plate 41. Since the light beam L15 has a polarization direction in parallel with the polarization axis 42 of the linear polarizer 40, it passes through the linear polarizer 40 to exit the same toward the viewer, which results in a white display.

As shown in FIG. 9B, when the illumination light from the backlight unit enters the linear polarizer 38, the light beam L12 is absorbed by the linear polarizer 38, and only the light beam L11 is transmitted by the linear polarizer 38. Then, the light beam L11 enters the $\lambda/4$ phase difference plate 39 and becomes a counterclockwise circularly polarized light beam L16 as viewed from the viewer's side. Next, the light beam L16 enters the liquid crystal layer 24. A predetermined voltage is applied to the liquid crystal molecules 60 in the liquid crystal layer 24, in which state they are aligned substantially perpendicularly to the substrate surfaces. In this state, since the liquid crystal molecules 60 have no refractive index anisotropy, there is substantially zero retardation in the liquid crystal layer 24. Thus, the light beam L16 exits the liquid crystal layer 24 while remaining in the counterclockwise circularly polarized state as viewed from the viewer's side. The light beam L16 enters the $\lambda/4$ phase difference plate 41 and becomes a linearly polarized light beam L17 which is perpendicular to the plane of the drawing and which exits the $\lambda/4$ phase difference plate 41. The light beam L18 is absorbed by the linear polarizer 40 because it has a polarization direction orthogonal to the polarization axis 42 of the linear polarizer 40, and the light does not exit toward the viewer, which results in a black display.

FIGS. 10A to 10D show states of display of the liquid crystal display of the present embodiment in the reflective mode, and FIGS. 11A to 11D show states of display of the liquid crystal display of the present embodiment in the transmissive mode. FIGS. 10A and 11A show states of display at a grayscale voltage of 0 V. FIGS. 10B and 11B show states of display at a grayscale voltage of 4.3 V. FIGS. 10C and 11C show states of display at a grayscale voltage of 5 V. FIGS. 10D and 11D show states of display at a grayscale voltage of 8 V.

As shown in FIG. 10A, the plurality of openings 36 are in the form of a rhombus having a width of 36 µm and a height of 4 µm, for example. Intervals between openings 36 adjacent to each other in the horizontal direction of the figure are 24 µm, and intervals between openings 36 adjacent to each other in the vertical direction of the figure are 20 µm.

As shown in FIGS. 10A to 10D, in the reflective mode, the liquid crystal display of the present embodiment provides a white display at the grayscale voltage of 0 V and provides darker displays as the grayscale voltage increases. The liquid crystal display of the present embodiment provides a black display at the grayscale voltage of 8 V. As shown in FIGS. 11A to 11D, in the transmissive mode, the liquid crystal display of the present embodiment provides a white display at the grayscale voltage of 0 V and provides darker displays as the grayscale voltage increases. The liquid crystal display of the present embodiment provides a black display at the grayscale voltage of 8 V. Thus, the present embodiment provides good display characteristics in both of the reflective and transmissive modes as shown in FIGS. 10A to 11D.

A description will now be made with reference to FIGS. 12 to 14D on a substrate for a liquid crystal display and a liquid crystal display having the same according to a third embodiment of the invention. The present embodiment is different from the second embodiment in that vertical alignment films made of polyimide resin, for example, are formed on surfaces of a TFT substrate 2 and an opposite substrate 4 facing each other. The substrates 2 and 4 are combined with a cell gap of 3 µm therebetween for example, and a nematic liquid crystal having negative dielectric anisotropy ($\Delta n=0.08$; $\Delta \epsilon=-4$) is sealed between the substrates 2 and 4. The alignment of the liquid crystal molecules is a homeotropic alignment in which the major axes of the liquid crystal molecules are in parallel with each other and are perpendicular to the substrate surfaces.

Figure 12:
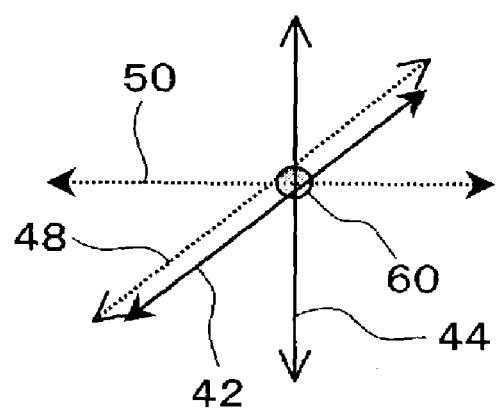
FIG. 12 shows an arrangement of optical axes of a liquid crystal display according to a third embodiment in the first mode for carrying out the invention.
Figure 13:
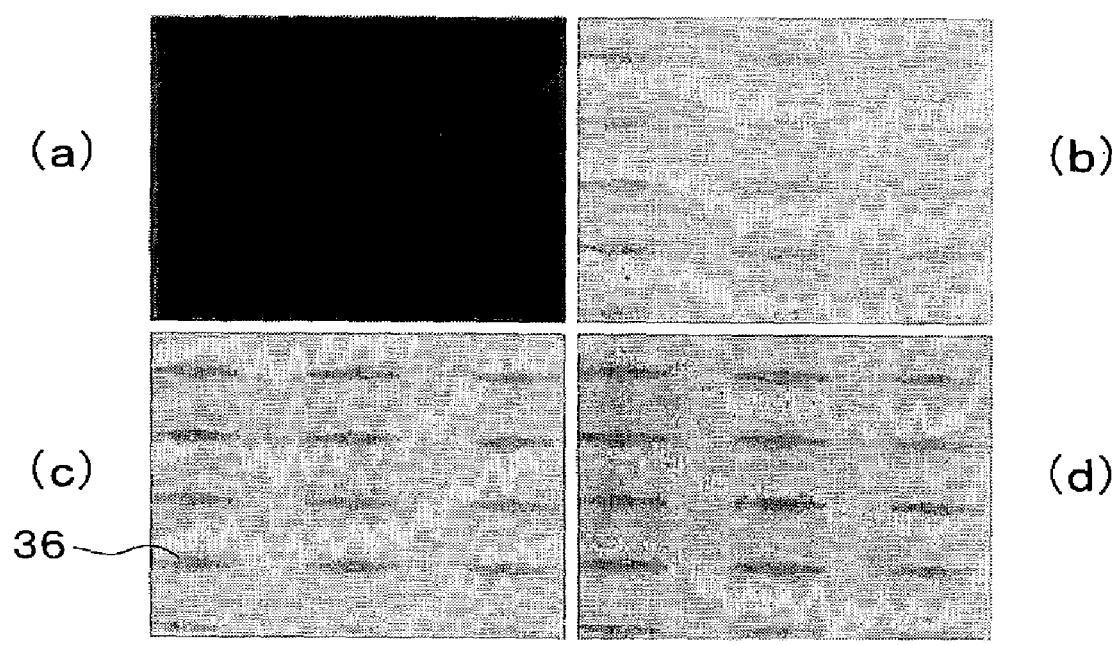
FIGS. 13A to 13D show states of display of the liquid crystal display in the reflective mode according to the third embodiment in the first mode for carrying out the invention.
Figure 14:
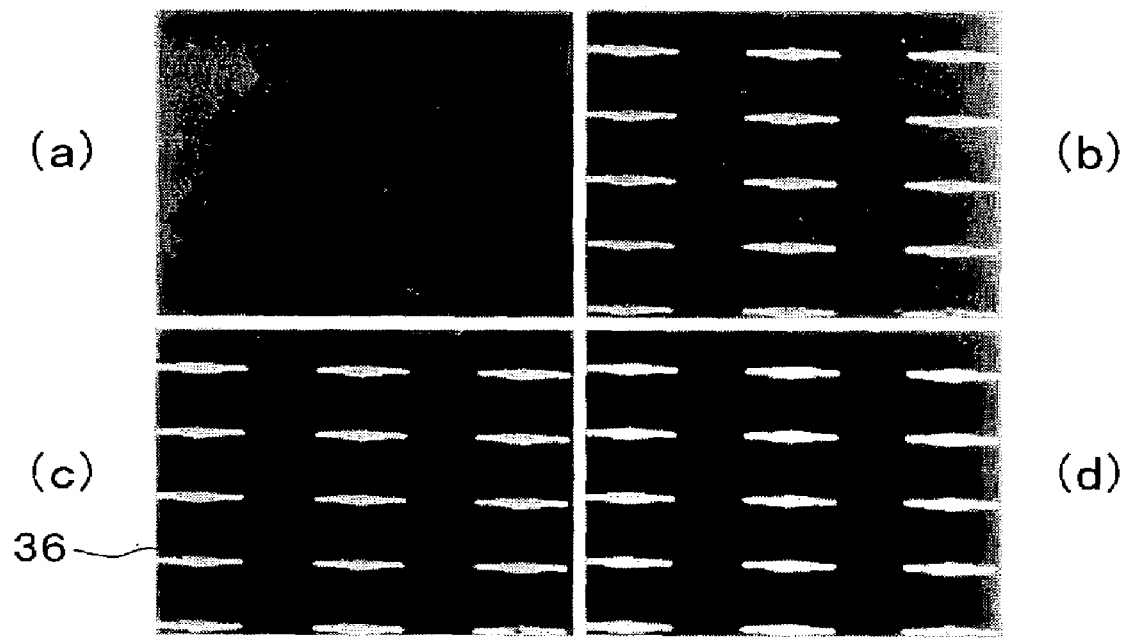
FIGS. 14A to 14D show states of display of the liquid crystal display in the transmissive mode according to the third embodiment in the first mode for carrying out the invention.

FIG. 12 shows an arrangement of optical axes of optical films of the liquid crystal display of the present embodiment as viewed from the viewer's side. Unlike the second embodiment shown in FIG. 8, the alignment of liquid crystal molecules 60 is oriented in a direction perpendicular to the plane of the drawing when no voltage is applied thereto. The arrangement of the optical axes of the optical films is similar to that in the second embodiment.

FIGS. 13A to 13D show states of display of the normally black mode liquid crystal display of the present embodiment in the reflective mode, and FIGS. 14A to 14D show states of display of the normally black mode liquid crystal display of the present embodiment in the transmissive mode. FIGS. 13A and 14A show states of display at a grayscale voltage of 0 V. FIGS. 13B and 14B show states of display at a grayscale voltage of 4.3 V. FIGS. 13C and 14C show states of display at a grayscale voltage of 5 V. FIGS. 13D and 14D show states of display at a grayscale voltage of 8 V.

As shown in FIGS. 13A to 13D, in the reflective mode, the liquid crystal display of the present embodiment provides a black display at the grayscale voltage of 0 V and provides brighter displays as the grayscale voltage 3 increases. The liquid crystal display of the present embodiment provides a white display at the grayscale voltage of 8 V. As shown in FIGS. 14A to 14D, in the transmissive mode, the liquid crystal display of the present embodiment provides a black display at the grayscale voltage of 0 V and provides brighter displays as the grayscale voltage increases. The liquid crystal display of the present embodiment provides a white display at the grayscale voltage of 8 V. Thus, the present embodiment provides good display characteristics in both of the reflective and transmissive modes as shown in FIGS. 13A to 14D.

A description will now be made with reference to FIGS. 15 to 17D on a substrate for a liquid crystal display and a liquid crystal display having the same according to a fourth embodiment of the invention. The liquid crystal display of the present embodiment has a configuration substantially similar to that of the second embodiment except for the orientation of the alignment of liquid crystal molecules 60 and the shape of openings 36.

Figure 15:
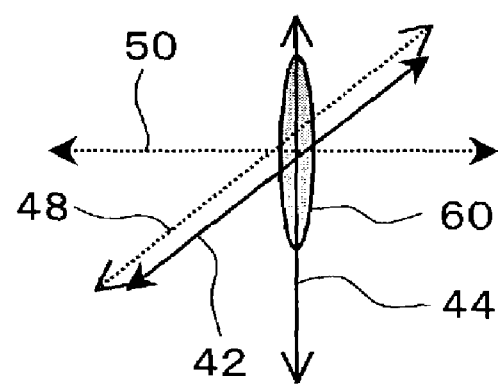
FIG. 15 shows an arrangement of optical axes of a liquid crystal display according to a fourth embodiment in the first mode for carrying out the invention.
Figure 16:
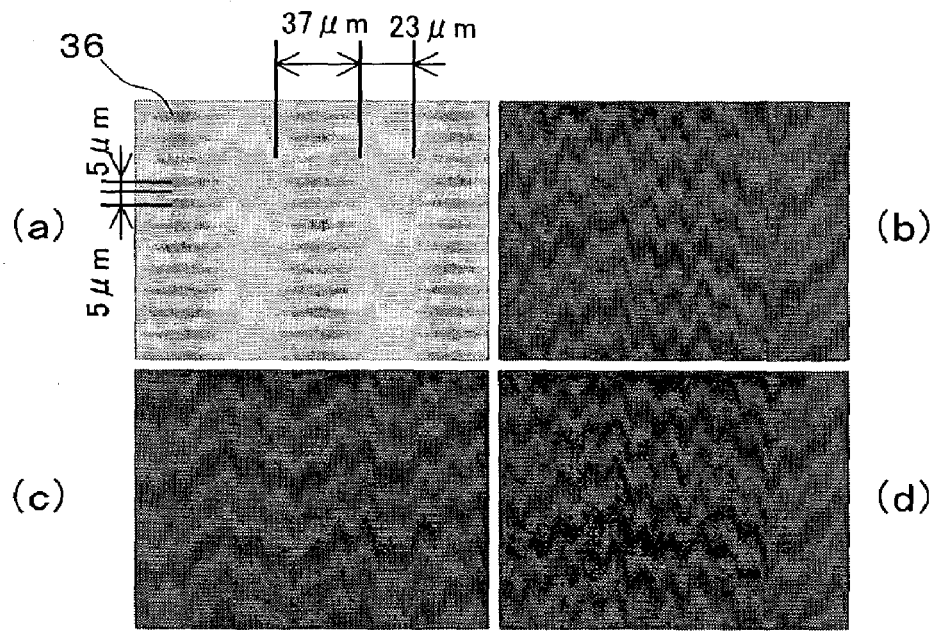
FIGS. 16A to 16D show states of display of the liquid crystal display in the reflective mode according to the fourth embodiment in the first mode for carrying out the invention.
Figure 17:
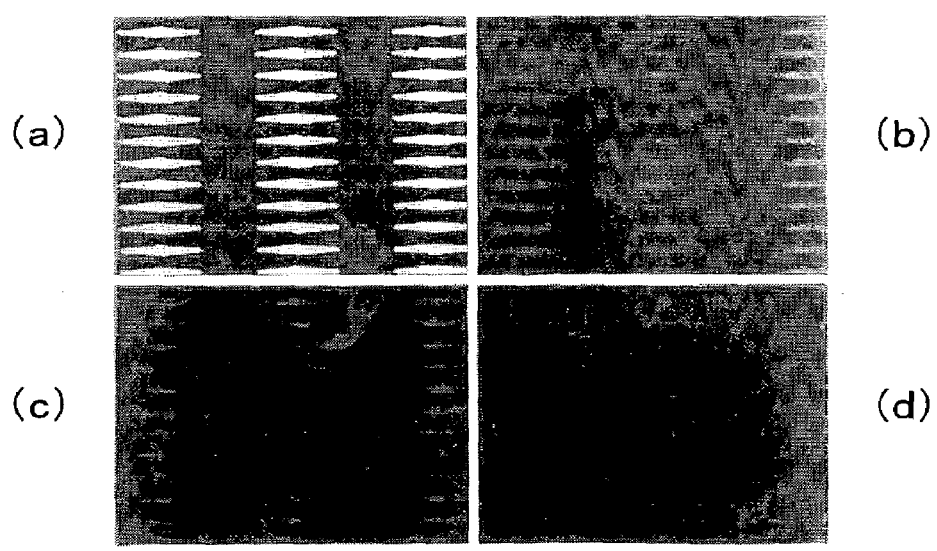
FIGS. 17A to 17D show states of display of the liquid crystal display in the transmissive mode according to the fourth embodiment in the first mode for carrying out the invention.

FIG. 15 shows an arrangement of optical axes of optical films of the liquid crystal display of the present embodiment as viewed from a viewer's side. Unlike the second embodiment shown in FIG. 8, the alignment of liquid crystal molecules 60 is oriented in a direction in parallel with a phase-delay axis 44 of a λ/4 phase difference plate 41 when no grayscale voltage is applied thereto. The arrangement of the optical axes of the optical films is similar to that in the second embodiment.

FIGS. 16A to 16D show states of display of the normally white mode liquid crystal display of the present embodiment in the reflective mode, and FIGS. 17A to 17D show states of display of the normally white mode liquid crystal display of the present embodiment in the transmissive mode. FIGS. 16A and 17A show states of display at a grayscale voltage of 0 V. FIGS. 16B and 17B show states of display at a grayscale voltage of 4.3 V. FIGS. 16C and 17C show states of display at a grayscale voltage of 5 V. FIGS. 16D and 17D show states of display at a grayscale voltage of 8 V. As shown in FIG. 16A, the plurality of openings 36 are in the form of a rhombus having a width of 37 µm and a height of 5 µm, for example. Intervals between openings 36 adjacent to each other in the horizontal direction of the figure are 23 µm, and intervals between openings 36 adjacent to each other in the vertical direction of the figure are 5 µm.

As shown in FIGS. 16A to 16D, in the reflective mode, the liquid crystal display of the present embodiment provides a white display at the grayscale voltage of 0 V and provides darker displays as the grayscale voltage increases. The liquid crystal display of the present embodiment provides a black display at the grayscale voltage of 8 V. As shown in FIGS. 17A to 17D, in the transmissive mode, the liquid crystal display of the present embodiment provides a white display at the grayscale voltage of 0 V and provides darker displays as the grayscale voltage increases. The liquid crystal display of the present embodiment provides a black display at the grayscale voltage of 8 V. Thus, the present embodiment provides good display characteristics in both of the reflective and transmissive modes as shown in FIGS. 16A to 17D.

A description will now be made with reference to FIGS. 18 to 20D on a substrate for a liquid crystal display and a liquid crystal display having the same according to a fifth embodiment of the invention. The liquid crystal display of the present embodiment has a configuration substantially similar to that of the fourth embodiment except for the shape of openings 36.

Figure 18:
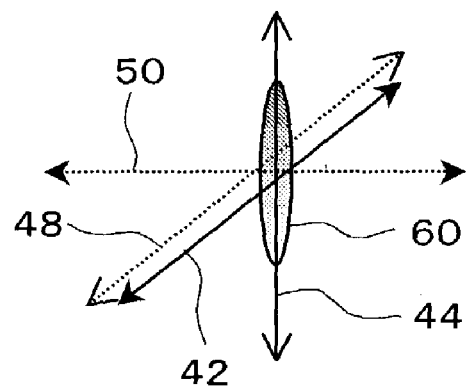
FIG. 18 shows an arrangement of optical axes of a liquid crystal display according to a fifth embodiment in the first mode for carrying out the invention.
Figure 19:
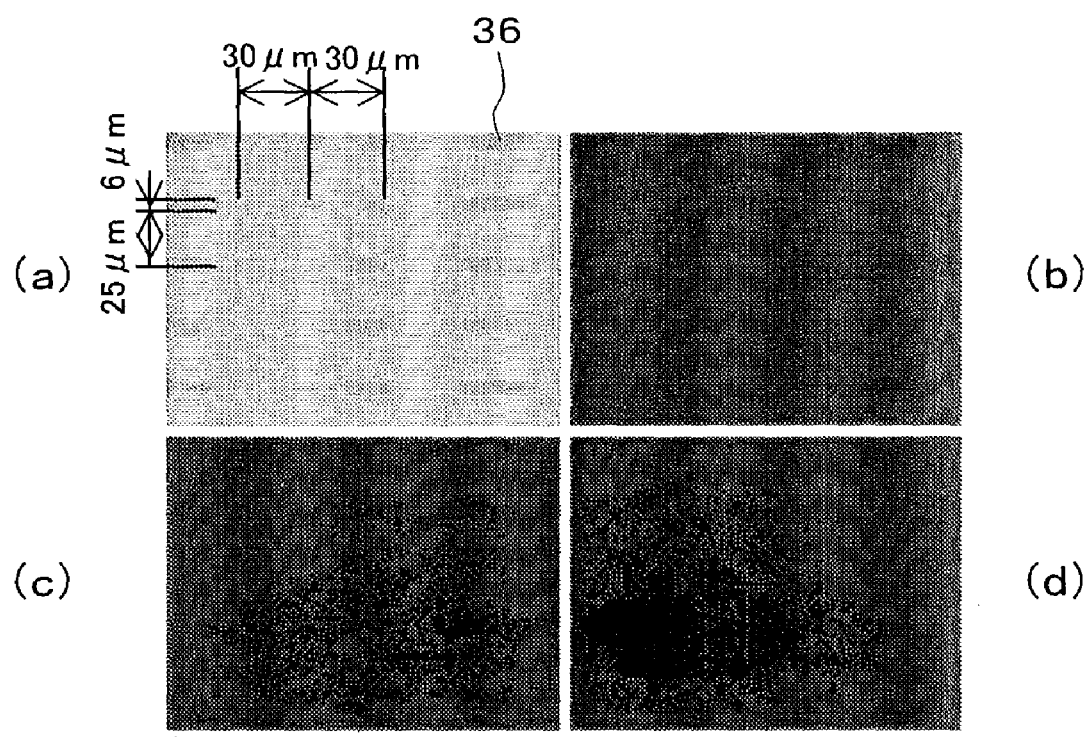
FIGS. 19A to 19D show states of display of the liquid crystal display in the reflective mode according to the fifth embodiment in the first mode for carrying out the invention.
Figure 20:
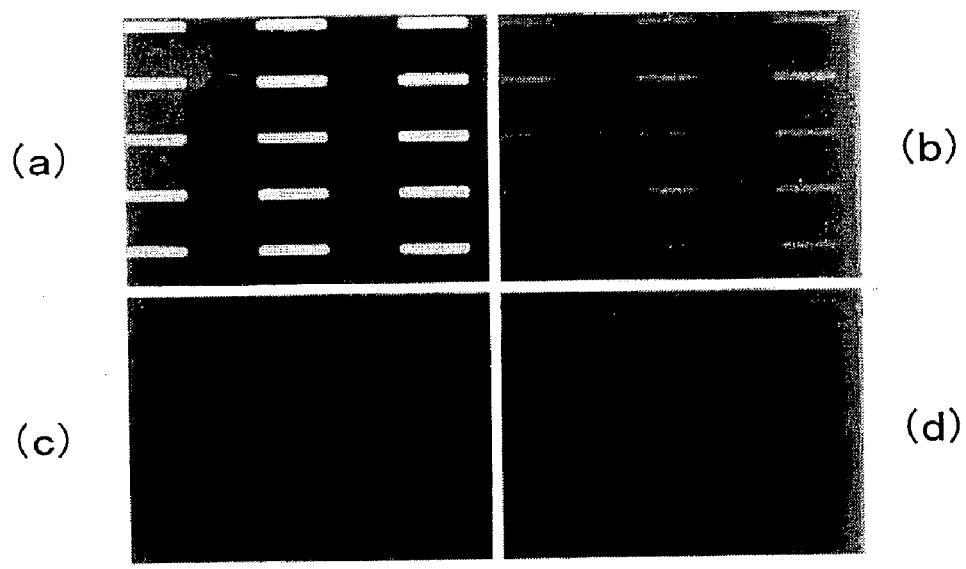
FIGS. 20A to 20D show states of display of the liquid crystal display in the transmissive mode according to the fifth embodiment in the first mode for carrying out the invention.

FIG. 18 shows an arrangement of optical axes of optical films of the liquid crystal display of the present embodiment as viewed from a viewer's side. The arrangement of the optical axes of the optical films is similar to that in the second embodiment.

FIGS. 19A to 19D show states of display of the normally white mode liquid crystal display of the present embodiment in the reflective mode, and FIGS. 20A to 20D show states of display of the normally white mode liquid crystal display of the present embodiment in the transmissive mode. FIGS. 19A and 20A show states of display at a grayscale voltage of 0 V. FIGS. 19B and 20B show states of display at a grayscale voltage of 4.3 V. FIGS. 19C and 20C show states of display at a grayscale voltage of 5 V. FIGS. 19D and 20D show states of display at a grayscale voltage of 8 V. As shown in FIG. 19A, the plurality of openings 36 are in the form of a rectangle having a width of 30 µm and a height of 6 µm, for example. Intervals between openings 36 adjacent to each other in the horizontal direction of the figure are 30 µm, and intervals between openings 36 adjacent to each other in the vertical direction of the figure are 25 µm.

As shown in FIGS. 19A to 19D, in the reflective mode, the liquid crystal display of the present embodiment provides a white display at the grayscale voltage of 0 V and provides darker displays as the grayscale voltage increases. The liquid crystal display of the present embodiment provides a black display at the grayscale voltage of 8 V. As shown in FIGS. 20A to 20D, in the transmissive mode, the liquid crystal display of the present embodiment provides a white display at the grayscale voltage of 0 V and provides darker displays as the grayscale voltage increases. The liquid crystal display of the present embodiment provides a black display at the grayscale voltage of 8 V. Thus, the present embodiment provides good display characteristics in both of the reflective and transmissive modes as shown in FIGS. 19A to 20D.

Figure 21:
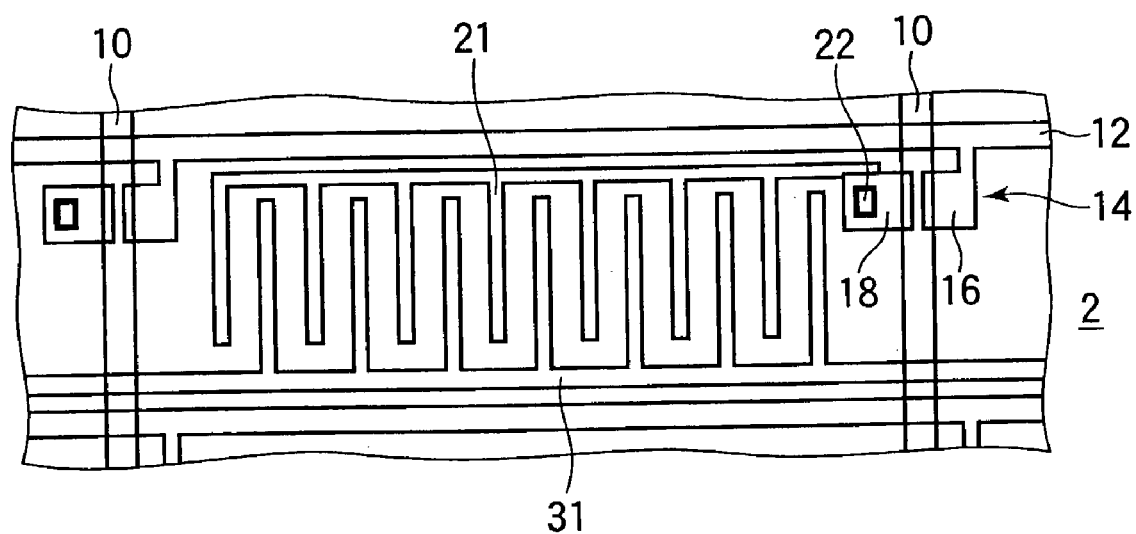
FIG. 21 shows a configuration of a liquid crystal display according to a sixth embodiment in the first mode for carrying out the invention.

A description will now be made with reference to FIG. 21 on a substrate for a liquid crystal display and a liquid crystal display having the same according to a sixth embodiment of the invention. As shown in FIG. 21, the liquid crystal display of the present embodiment is an IPS (In-Plane Switching) mode liquid crystal display in which liquid crystal molecules are driven by a transverse electric field. A comb-shaped reflective electrode 21 and a comb-shaped common electrode 31 facing the reflective electrode 21 are provided in each pixel region on a TFT substrate 2. The region where the reflective electrode 21 and the common electrode 31 are formed serves as a reflective region R, and the region between the electrodes 21 and 31 serves as a transmissive region T. Alignment films formed on the TFT substrate 2 and an opposite substrate 4 may be either horizontal alignment films or vertical alignment films. The present embodiment can provide advantages similar to those of the first embodiment.

Figure 22A:
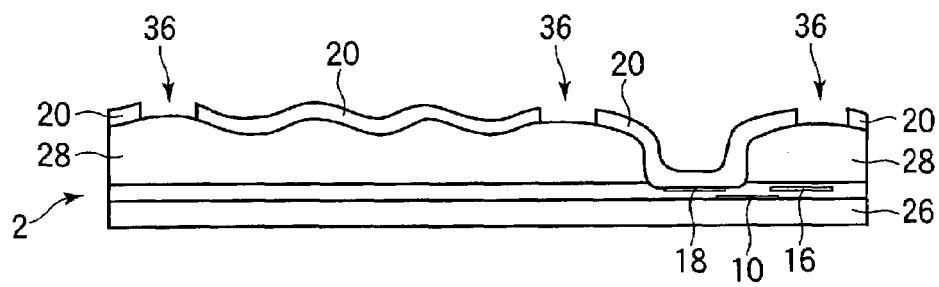
FIGS. 22A and 22B show a configuration of a substrate for a liquid crystal display according to a seventh embodiment in the first mode for carrying out the invention.
Figure 22B:
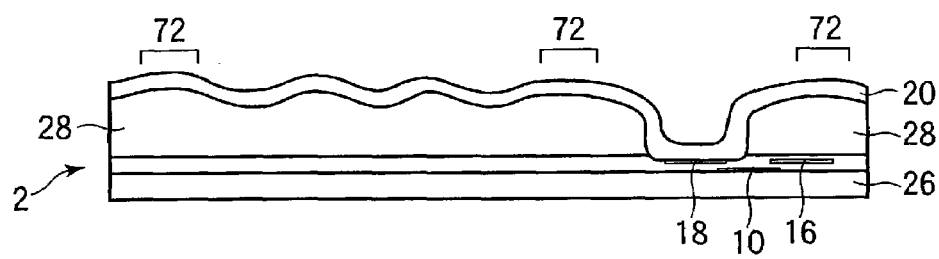

A substrate for a liquid crystal display according to a seventh embodiment of the invention will now be described with reference to FIGS. 22A and 22B and FIG. 23. FIGS. 22A and 22B show a schematic configuration of the substrate for a liquid crystal display of the present embodiment. FIG. 22A shows a sectional configuration of a TFT substrate 2 of the present embodiment, and FIG. 22B shows the section of the TFT substrate 2 before the formation of openings 36.

As shown in FIG. 22A, a plurality of recesses and projections are formed on a surface of a planarization film 28. A reflective electrode 20 is formed on the planarization film 28. On a surface of the reflecting film 20, recesses and projections are formed in association with the recesses and projections formed on the surface of the planarization film 28 located under the same. A plurality of openings 36 are formed on the reflective electrode 20. The openings 36 are formed in substantially flat regions 72 as shown in FIG. 22B where the surface of the reflective electrode 20 is at an average inclination of 5 degrees or less to the substrate surface.

Figure 23:
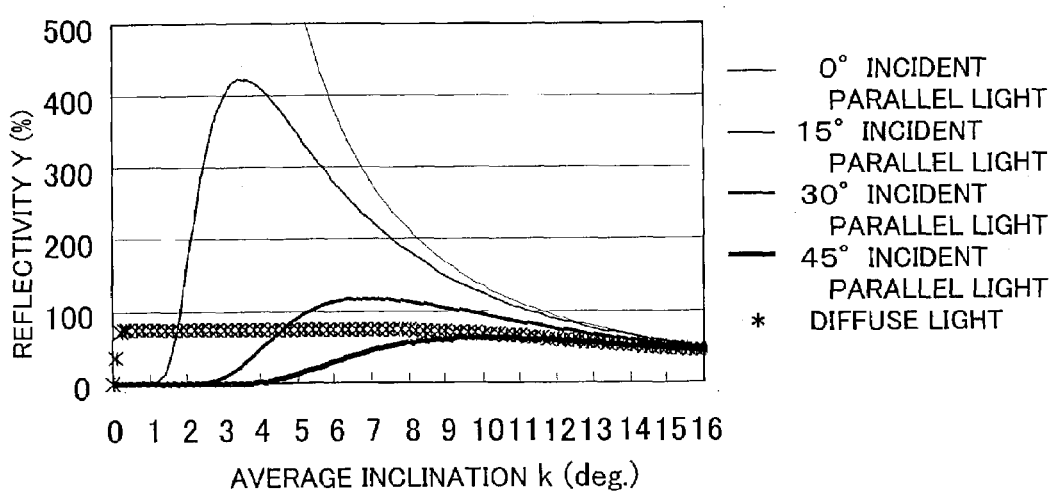
FIG. 23 is a graph showing a relationship between reflectivity and average inclinations that is a prerequisite for the seventh embodiment in the first mode for carrying out the invention.

FIG. 23 shows changes in reflectivity Y of the reflective electrode 20 depending on an average inclination k. The abscissa axis represents the average inclination k (deg.) of the reflective electrode 20 relative to the substrate surface, and the ordinate axis represents the reflectivity Y (%) in a direction perpendicular to the substrate surface. Parallel light at incident angles of 0 deg., 15 degrees, 30 degrees, and 40 degrees and diffuse light produced using an integrating sphere are used as incident light.

As shown in FIG. 23, the greater the incident angle of parallel light, the greater the average inclination k that yields the maximum reflectivity Y. It is apparent that an average inclination k in a range of 5 degrees or less does not contribute to improvement of reflection characteristics in an actual environment because light enters the liquid crystal display in various directions in an actual environment of use. Therefore, transmission characteristics can be improved while suppressing reduction of reflection characteristics by forming the openings 36 in the substantially flat regions 72 where the average inclination k is 5 degrees or less. The present embodiment makes it possible to provide a transflective liquid crystal display that utilizes light with high efficiency.

Figure 24:
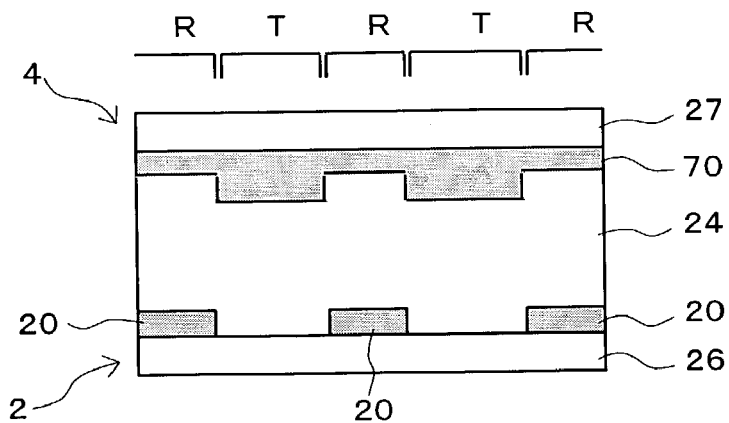
FIG. 24 shows a configuration of a liquid crystal display according to an eighth embodiment in the first mode for carrying out the invention.

A description will now be made with reference to FIGS. 24 to 26 on a substrate for a liquid crystal display and a liquid crystal display having the same according to an eighth embodiment of the invention. FIG. 24 shows a sectional configuration of the substrate for a liquid crystal display and the liquid crystal display having the same of the present embodiment. FIG. 24 omits a planarization film 28 that makes a cell gap d1 in a reflective region R substantially equal to one-half of a cell gap d2 in a transmissive region T. As shown in FIG. 24, an opposite substrate 4 has a CF layer 70 on a glass substrate 27. The CF layer 70 is formed such that it has a thickness in a transmissive region T that is substantially twice the thickness of the same in a reflective region R and is formed with different degrees of color purity. The present embodiment provides improved display characteristics because there is no chromatic deviation between the reflective mode and transmissive mode.

Figure 25:
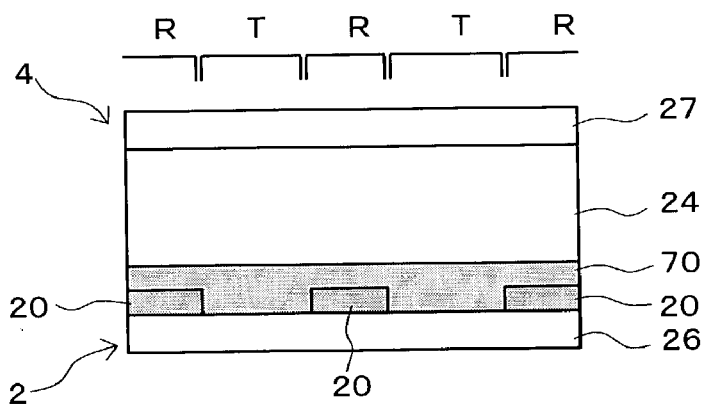
FIG. 25 shows a modification of the configuration of the liquid crystal display according to the eighth embodiment in the first mode for carrying out the invention.

FIG. 25 shows a modification of the substrate for a liquid crystal display and the liquid crystal display having the same of the present embodiment. FIG. 25 omits a planarization film 28 that makes a cell gap d1 in a reflective region R substantially equal to one-half of a cell gap d2 in a transmissive region T. As shown in FIG. 25, a TFT substrate 2 has a CF layer 70 on a glass substrate 20. Since the surface of the CF layer 70 is substantially flatly formed, the CF layer 70 is formed such that it is different in thickness between a reflective region R where a reflective electrode 20 is formed and a transmissive region T where no reflective electrode 20 is formed. The present embodiment provides improved display characteristics because there is no chromatic deviation between the reflective mode and transmissive mode.

Figure 26:
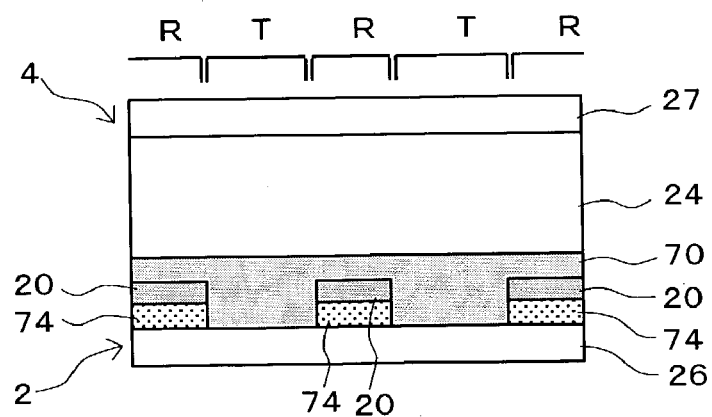
FIG. 26 shows another modification of the configuration of the liquid crystal display according to the eighth embodiment in the first mode for carrying out the invention.

FIG. 26 shows another modification of the substrate for a liquid crystal display and the liquid crystal display having the same of the present embodiment. FIG. 26 omits a planarization film 28 that makes a cell gap d1 in a reflective region R substantially equal to one-half of a cell gap d2 in a transmissive region T. As shown in FIG. 26, a thickness adjusting film 74 for adjusting the thickness of a CF layer 70 in reflective regions R is formed under reflective electrodes 20. For example, the thickness adjusting film 74 is formed of the same material as that of a protective film (not shown)

for TFTs 14 at the same time when the latter is formed. Since the surface of the CF layer 70 is substantially flatly formed, the CF layer 70 is formed such that it is different in thickness between the reflective regions R and transmissive regions T. The present embodiment provides improved display characteristics because there is no chromatic deviation between the reflective mode and transmissive mode.

As described above, in the present mode for carrying out the invention, it is possible to provide a substrate for a liquid crystal display and a liquid crystal display having the same which achieve excellent display characteristics at a low cost.

Second Mode for Carrying Out the Invention

Second Mode for Carrying Out the Invention

Figure 27:
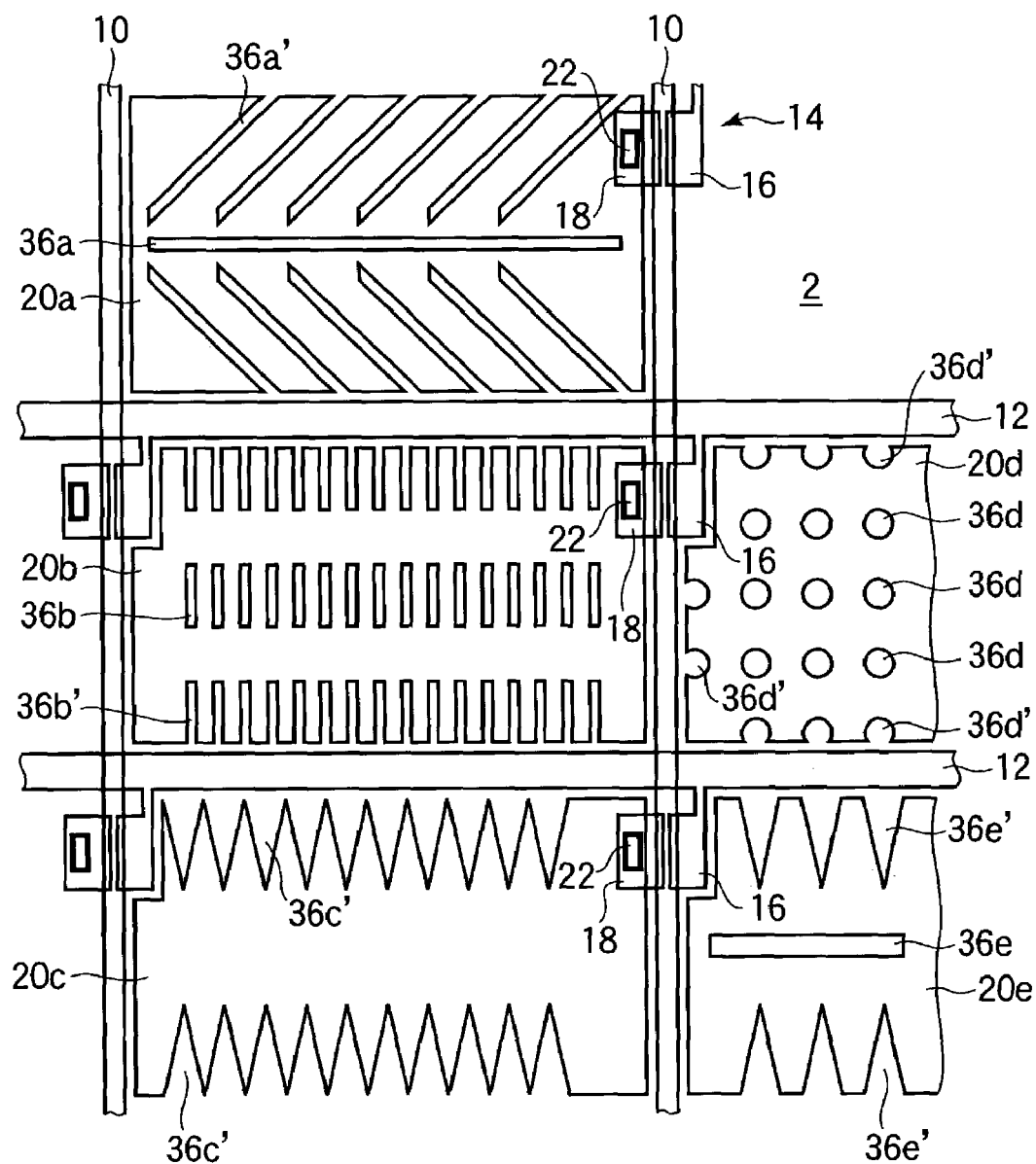
FIG. 27 shows a configuration of a liquid crystal display in a second mode for carrying out the invention.

A liquid crystal display in a second mode for carrying out the invention will now be described with reference to FIGS. 27 and 28. FIG. 27 shows a configuration of the liquid crystal display in the present mode for carrying out the invention. Components having functions and effects like those in the liquid crystal display in the first mode for carrying out the invention are indicated by like reference numerals and will not be described here. As shown in FIG. 27, reflective electrodes 20*a* to 20*e* that constitute reflective regions of a transflective liquid crystal display are formed in regions defined by gate bus lines 10 and drain bus lines 12. The reflective electrodes 20*a*, 20*b*, 20*d*, and 20*e* are respectively formed with openings 36*a*, 36*b*, 36*d*, and 36*e* formed in various configurations such as slits and circular holes. Notches 36*a*' to 36*e*' in various configurations such as slits and circular or polygonal holes are formed at the periphery of the reflective electrodes 20*a* to 20*e*, respectively.

For example, the reflective electrode 20*a* is formed with one opening 36*a* in the form of a slit extending substantially in parallel with longer sides of the reflective electrode 20*a* and a plurality of notches 36*a*' in the form of slits that are inwardly cut at the two longer sides of the reflecting electrode 20*a* opposite to each other and that extend at an angle to the longer sides. The reflective electrode 20*b* is formed with a plurality of opening 36*b* in the form of slits extending substantially in parallel with shorter sides of the reflective electrode 20*b* and a plurality of notches 36*b*' in the form of slits that are inwardly cut at two longer sides of the reflecting electrode 20*b* and that extend substantially in parallel with the shorter sides thereof. The reflective electrode 20*c* has a plurality of notches 36*c*' adjacent to each other in the form of wedges that are inwardly cut at two longer sides of the reflective electrode 20*c* and that extend substantially in parallel with shorter sides of the reflective electrode 20*c*. The reflective electrode 20*d* is formed with a plurality of circular openings 36*d* and a plurality of circular notches 36*d*' that are inwardly cut at two longer sides and two shorter sides of the reflecting electrode 20*d*. The reflective electrode 20*e* is formed with one opening 36*e* in the form of a slit extending substantially in parallel with longer sides of the reflective electrode 20*e* and a plurality of notches 36*e*' in the form of wedges that are inwardly cut at two longer sides of the reflecting electrode 20*e* and that extend substantially in parallel with shorter sides of the reflective electrode 20*e*.

The regions where the reflective electrodes 20*a* to 20*e* are formed serve as reflective regions. The regions where the openings 36*a*, 36*b*, 36*d*, and 36*e* and the regions at the periphery of the reflective electrodes 20*a* to 20*e* where the notches 36*a*' to 36*e*' are formed serve as transmissive regions. No transparent electrode is formed at the openings 36*a*, 36*b*, 36*d*, and 36*e* and the notches 36*a*' to 36*e*'. Liquid crystal molecules in the transmissive regions are driven by an oblique field that is present between edges of the reflective electrodes 20*a* to 20*e* and a common electrode 52 (not shown in FIG. 27) at the opposite substrate 4 substantially similarly to liquid crystal molecules in the respective reflective regions at the same pixels.

While the openings 36*a*, 36*b*, 36*d*, and 36*e* and the notches 36*a*' to 36*e*' in FIG. 27 are formed in configurations that vary from pixel to pixel, the openings 36*a*, 36*b*, 36*d*, and 36*e* and the notches 36*a*' to 36*e*' may be formed in the same configuration in the respective pixels. The openings 36*a*, 36*b*, 36*d*, and 36*e* and the notches 36*a*' to 36*e*' may have a configuration to regulate alignment of liquid crystal molecules. As a result, in a VA (Vertical Aligned) mode liquid crystal display in which liquid crystal molecules are aligned substantially perpendicularly to the substrate surface, separate alignments can be achieved without a process of rubbing the alignment film. The present mode for carrying out the invention may be applied to a liquid crystal display in the TN mode utilizing a horizontal alignment film or the HAN (Hybrid Aligned Nematic) mode utilizing a horizontal alignment film in one direction and a vertical alignment film in another, although a rubbing process is required. In the present mode for carrying out the invention, it is possible to achieve transmission characteristics higher than those of a transflective liquid crystal display in the related art.

Figure 28:
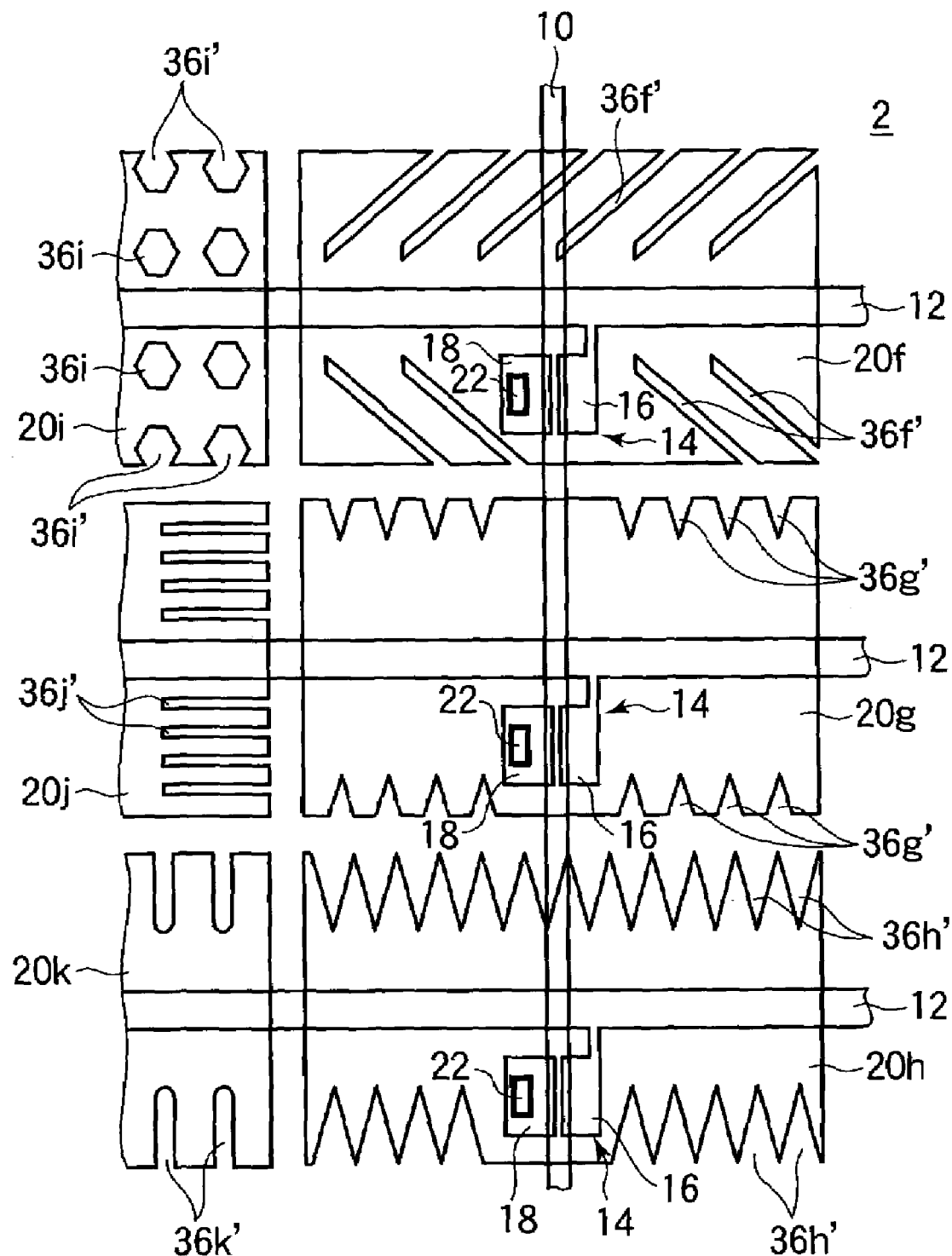
FIG. 28 shows a modification of the configuration of the liquid crystal display in the first mode for carrying out the invention.
Figure 29:
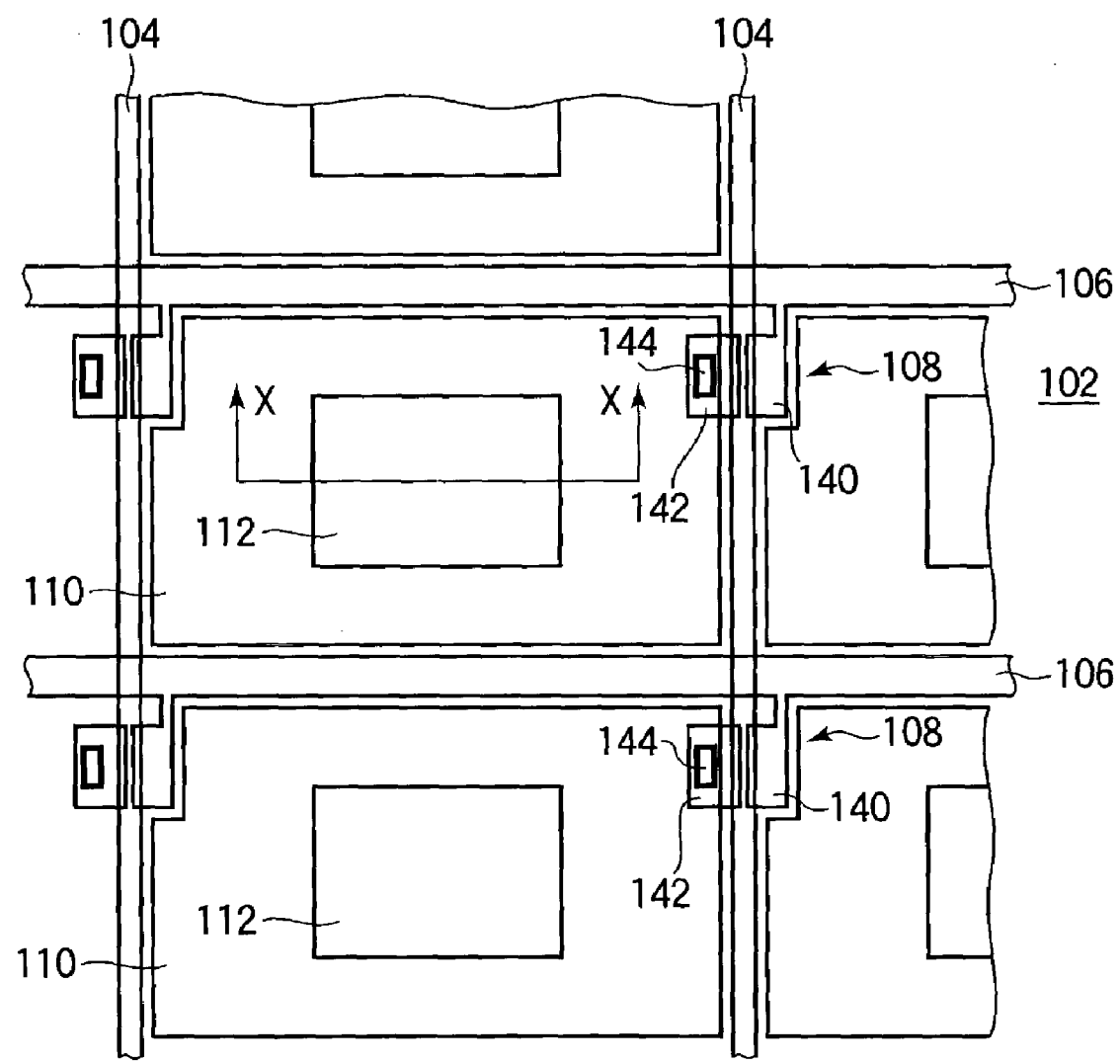
FIG. 29 shows a configuration of a transflective liquid crystal display according to the related art.

FIG. 28 shows a modification of the configuration of the liquid crystal display in the present mode for carrying out the invention. As shown in FIG. 28, reflective electrodes 20*f* to 20*k* are formed at intersections between bus lines 10 and 12 and above TFTs 14. Openings 36*i* and notches 36*f*' to 36*k*' having various configurations are formed at the reflective electrodes 20*f* to 20*k*.

For example, the reflective electrode 20*f* is formed with a plurality of notches 36*f*' that are inwardly cut at two longer sides and one shorter side of the reflective electrode 20*f* and that extend at an angle to the longer sides of the reflective electrode 20*f*. The reflective electrode 20*g* is formed with a plurality of triangular notches 36*g*' that are inwardly cut at two longer sides of the reflective electrode 20*g*. The reflective electrode 20*h* is formed with a plurality of notches 36*h*' adjacent to each other in the form of wedges that are inwardly cut at two longer sides of the reflective electrode 20*h* and that extend substantially in parallel with shorter sides of the reflective electrode 20*h*. The reflective electrode 20*i* is formed with a plurality of hexagonal openings 36*i* and a plurality of hexagonal notches 36*i*' that are inwardly cut at two longer sides of the reflecting electrode 20*i*. The reflective electrode 20*j* is formed with a plurality of notches 36*j*' in the form of slits that are inwardly cut at a shorter side of the reflective electrode 20*j* and that extend substantially in parallel with longer sides of the reflective electrode 20*j*. The reflective electrode 20*k* is formed with a plurality of notches 36*k*' in the form of slits that are inwardly cut at two longer sides of the reflective electrode 20*k* and that extend substantially in parallel with shorter sides of the reflective electrode 20*k*. The ends of the notches 36*k*' are circularly rounded.

The regions where the reflective electrodes 20*f* to 20*k* are formed serve as reflective regions. The regions where the openings 36*i* are formed, the regions at the periphery of the reflective electrodes 20*f* to 20*k* where the notches 36*f*' to 36*k*' are formed, and the regions around the reflective electrodes 20*f* to 20*k* serve as transmissive regions. The present modification makes it possible to achieve transmission characteristics higher than those of a transflective liquid crystal display in the related art.

The invention is not limited to the above-described modes for carrying out the same, and various modifications are possible. For example, while light scattering characteristics are improved by recesses and projections formed on the surface of the reflective electrodes 20 in the above-described modes for carrying out the invention, the invention is not limited to the same. Light scattering characteristics may be improved by forming the reflective electrodes 20 may be formed with a flat surface (mirror surface) and by providing a forward scattering plate on the opposite substrate 4 on the viewer's side.

As described above, the invention makes it possible to provide a substrate for a liquid crystal display and a liquid crystal display having the same which achieve excellent display characteristics at a low cost.

What is claimed is:

1. A substrate for a liquid crystal display comprising:
   a base substrate sandwiching a liquid crystal in combination with a counter substrate having a transparent common electrode provided counter thereto;
   a plurality of bus lines formed on the base substrate such that they intersect with each other with an insulation film interposed therebetween;
   thin film transistors formed in the vicinity of positions where the plurality of bus lines intersect with each other; and
   a plurality of pixel regions constituted of a plurality of reflective regions in which reflective electrodes for reflecting incident light from the side of the top surface of the base substrate are formed in the form of a matrix and give a reflective operation and transmissive regions which are provided around the plurality of reflective regions and which transmit incident light from the side of a bottom surface of the base substrate toward the top surface of the base substrate, wherein said transmissive regions are regions without electrodes and that give a transmissive operation.

2. A substrate for a liquid crystal display according to claim 1, wherein the reflective regions are formed above the positions where the plurality of bus lines intersect with each other.

3. A substrate for a liquid crystal display according to claim 1, wherein the reflective regions are formed above the thin film transistors.

4. A substrate for a liquid crystal display according to claim 1, wherein the transmissive regions are formed between the reflective electrodes located adjacent to each other.

5. A substrate for a liquid crystal display comprising:
   a base substrate that sandwiches a liquid crystal in combination with a counter substrate having a common electrode provided counter thereto;
   a plurality of bus lines formed on the base substrate such that they intersect with each other with an insulation film interposed therebetween;
   thin film transistors formed in the vicinity of positions where the plurality of bus lines intersect with each other; and
   a plurality of pixel regions constituted of a plurality of reflective regions in which reflective electrodes for reflecting incident light from the side of the top surface of the base substrate are formed in the form of a matrix and transmissive regions which are formed without electrodes by providing openings in the reflective regions and which transmit incident light from the side of a bottom surface of the base substrate toward the top surface of the base substrate,
   wherein the reflective regions cover the positions where the plurality of bus lines intersect with each other.

6. A substrate for a liquid crystal display according to claim 5, wherein the transmissive regions have a polygonal configuration.

7. A substrate for a liquid crystal display according to claim 5, wherein the reflective electrodes have recesses and projections on a surface thereof.

8. A substrate for a liquid crystal display according to claim 7, wherein the transmissive regions are formed in substantially flat regions of the reflective electrodes.

9. A substrate for a liquid crystal display according to claim 8, wherein the flat regions are at an average inclination of 5 degrees or less to the substrate surface.

10. A substrate for a liquid crystal display according to claim 1, wherein the transmissive regions are recessed relative to the reflective regions.

11. A substrate for a liquid crystal display according to claim 5, wherein the transmissive regions are recessed relative to the reflective regions.

12. A liquid crystal display comprising:
    a base substrate sandwiching the liquid crystal in combination with a counter substrate having a transparent common electrode provided counter thereto;
    a plurality of bus lines formed on the base substrate such that they intersect with each other with an insulation film interposed therebetween;
    thin film transistors formed in the vicinity of positions where the plurality of bus lines intersect with each other; and
    a plurality of pixel regions constituted of a plurality of reflective regions in which reflective electrodes for reflecting incident light from the side of the top surface of the base substrate are formed in the form of a matrix and give a reflective operation and transmissive regions which are provided around the plurality of reflective regions and which transmit incident light from the side of a bottom surface of the base substrate toward the top surface of the base substrate, wherein said transmissive regions are regions without electrodes on the substrate and that give a transmissive operation.

13. A liquid crystal display according to claim 12, wherein a color filter layer is provided on either of the substrates and wherein the color filter layer has different degrees of color purity in the transmissive regions and the reflective regions.

14. A liquid crystal display according to claim 13, wherein the color filter layer is formed with different thicknesses in the transmissive regions and the reflective regions.

15. A liquid crystal display according to claim 14, wherein the color filter layer in the transmissive regions is formed with a thickness which is substantially twice tat in the reflective regions.

16. A liquid crystal display comprising:
    a base substrate that sandwiches the liquid crystal in combination with a counter substrate having a common electrode provided counter thereto;
    a plurality of bus lines formed on the base substrate such that they intersect with each other with an insulation film interposed therebetween;
    thin film transistors formed in the vicinity of positions where the plurality of bus lines intersect with each other; and
    a plurality of pixel regions constituted of a plurality of reflective regions in which reflective electrodes for reflecting incident light from the side of the top surface of the base substrate are formed in the form of a matrix and transmissive regions which are formed without electrodes on the base substrate by providing openings in the reflective regions and which transmit incident light from the side of a bottom surface of the base substrate toward the top surface of the base substrate, wherein the reflective regions cover the positions where the plurality of bus lines intersect with each other.

17. A liquid crystal display according to claim 16, wherein a color filter layer is provided on either of the substrates and wherein the color filter layer has different degrees of color purity in the transmissive regions and the reflective regions.

18. A liquid crystal display according to claim 17, wherein the color filter layer is formed with different thicknesses in the transmissive regions and the reflective regions.

19. A liquid crystal display according to claim 18, wherein the color filter layer in the transmissive regions is formed with a thickness which is substantially twice that in the reflective regions.

20. A substrate for a liquid crystal display according to claim 12, wherein the reflective regions are formed above the positions where the plurality of bus lines intersect with each other.

* * * * *

UNITED STATES PATENT AND TRADEMARK OFFICE
CERTIFICATE OF CORRECTION

| | | |
|---|---|---|
| PATENT NO. | : 7,027,116 B2 | Page 1 of 1 |
| APPLICATION NO. | : 10/335959 | |
| DATED | : April 11, 2006 | |
| INVENTOR(S) | : Ohmuro et al. | |

It is certified that error appears in the above-identified patent and that said Letters Patent is hereby corrected as shown below:

Col. 20, line 49, delete "tat" and insert --that--.

Signed and Sealed this

Fifteenth Day of August, 2006

JON W. DUDAS
*Director of the United States Patent and Trademark Office*